US012296595B2

(12) United States Patent
Hasegawa et al.

(10) Patent No.: US 12,296,595 B2
(45) Date of Patent: May 13, 2025

(54) LIQUID EJECTING APPARATUS AND LIQUID FILLING METHOD

(71) Applicant: SEIKO EPSON CORPORATION, Tokyo (JP)

(72) Inventors: Yu Hasegawa, Shiojiri (JP); Eiichiro Watanabe, Matsumoto (JP); Masami Ota, Azumino (JP); Hiroaki Okui, Azumino (JP)

(73) Assignee: SEIKO EPSON CORPORATION (JP)

( * ) Notice: Subject to any disclaimer, the term of this patent is extended or adjusted under 35 U.S.C. 154(b) by 167 days.

(21) Appl. No.: 18/328,131

(22) Filed: Jun. 2, 2023

(65) Prior Publication Data

US 2023/0391092 A1 Dec. 7, 2023

(30) Foreign Application Priority Data

Jun. 3, 2022 (JP) ................................. 2022-090712

(51) Int. Cl.
*B41J 2/175* (2006.01)

(52) U.S. Cl.
CPC .................................... *B41J 2/175* (2013.01)

(58) Field of Classification Search
CPC . B41J 2/18; B41J 2/175; B41J 2/17596; B41J 2/14233; B41J 2/14; B41J 2002/14419; B41J 2202/20; B41J 2202/11; B41J 2202/19; B41J 2002/14338; B41J 2202/12
See application file for complete search history.

(56) References Cited

U.S. PATENT DOCUMENTS

| | | | | |
|---|---|---|---|---|
| 9,073,336 | B1 * | 7/2015 | Matsumoto | B41J 2/175 |
| 9,751,317 | B2 * | 9/2017 | Nakamura | B41J 2/16508 |
| 11,117,374 | B2 * | 9/2021 | Nakagawa | B41J 2/1404 |
| 11,827,016 | B2 * | 11/2023 | Watanabe | B41J 2/175 |

FOREIGN PATENT DOCUMENTS

JP 2015-058581 A 3/2015

* cited by examiner

*Primary Examiner* — An H Do
(74) *Attorney, Agent, or Firm* — Harness, Dickey & Pierce, P.L.C.

(57) ABSTRACT

A liquid ejecting apparatus includes a liquid ejection head, a supply tank, a recovery tank, a supply flow path, a recovery flow path, a pressurizing mechanism pressurizing the inside of the supply tank, and a depressurizing mechanism depressurizing the inside of the recovery tank. A filling period, in which a filling process is performed to fill, with the liquid, a nozzle, the supply flow path, and the recovery flow path, includes a period that is after a meniscus is formed in the nozzle and before the liquid reaches the recovery flow path. In the period, the pressurizing and the depressurizing mechanisms are driven; and in the period, Pt_out>−|Pm| is satisfied, where Pm indicates a pressure at which the meniscus is broken and Pt_out indicates a pressure in the recovery tank.

20 Claims, 13 Drawing Sheets

LIQUID EJECTING APPARATUS AND LIQUID FILLING METHOD

The present application is based on, and claims priority from JP Application Serial Number 2022-090712, filed Jun. 3, 2022 the disclosure of which is hereby incorporated by reference herein in its entirety.

BACKGROUND

1. Technical Field

The present disclosure relates to a liquid ejecting apparatus and a liquid filling method.

2. Related Art

There is a known liquid ejecting apparatus, such as an ink jet printer, that includes a liquid ejection head including a nozzle for ejecting a liquid, such as ink. For example, JP-A-2015-058581 describes a liquid ejecting apparatus including a supply tank that temporarily stores a liquid to be supplied to a liquid ejection head, a recovery tank that temporarily stores the liquid recovered from the liquid ejection head, a supply flow path for supplying the liquid from the supply tank to the liquid ejection head, and a recovery flow path for recovering the liquid from the liquid ejection head to the recovery tank. In this liquid ejecting apparatus, when filling the nozzle, the supply flow path, and the recovery flow path with the liquid, the liquid is discharged from the nozzle by pressurizing the insides of both of the supply tank and the recovery tank.

In the related-art technology described above, to reduce the amount of liquid to be discharged from the nozzle when filling the nozzle, the supply flow path, and the recovery flow path with the liquid, a filling process may be performed such that the nozzle, the supply flow path, and the recovery flow path are filled with the liquid by pressurizing the inside of the supply tank and depressurizing the inside of the recovery tank instead of pressurizing the insides of both of the supply tank and the recovery tank. However, when the inside of the recovery tank is depressurized during the filling process, air bubbles may be drawn into the flow path in the liquid ejection head.

SUMMARY

According to an aspect of the present disclosure, a liquid ejecting apparatus includes a liquid ejection head including a nozzle that ejects a liquid, a supply tank that temporarily stores the liquid to be supplied to the liquid ejection head, a recovery tank that temporarily stores the liquid recovered from the liquid ejection head, a supply flow path through which the liquid is supplied from the supply tank to the liquid ejection head, a recovery flow path through which the liquid is recovered from the liquid ejection head to the recovery tank, a pressurizing mechanism that pressurizes the inside of the supply tank, and a depressurizing mechanism that depressurizes the inside of the recovery tank. A filling period, in which a filling process is performed to fill, with the liquid, the nozzle, the supply flow path, and the recovery flow path that are not filled with the liquid, includes a first period that is after a meniscus of the liquid is formed in the nozzle and before the liquid reaches the recovery flow path. In the first period, the pressurizing mechanism and the depressurizing mechanism are driven; and in the first period, $Pt\_out > -|Pm|$ is satisfied, where Pm indicates a pressure at which the meniscus of the liquid formed in the nozzle is broken and Pt_out indicates a pressure in the recovery tank.

According to an aspect of the present disclosure, a liquid filling method is performed by a liquid ejecting apparatus including a liquid ejection head including a nozzle that ejects a liquid, a supply tank that temporarily stores the liquid to be supplied to the liquid ejection head, a recovery tank that temporarily stores the liquid recovered from the liquid ejection head, a supply flow path through which the liquid is supplied from the supply tank to the liquid ejection head, a recovery flow path through which the liquid is recovered from the liquid ejection head to the recovery tank, a pressurizing mechanism that pressurizes the inside of the supply tank, and a depressurizing mechanism that depressurizes the inside of the recovery tank. The liquid filling method includes when a filling period, in which a filling process is performed to fill, with the liquid, the nozzle, the supply flow path, and the recovery flow path that are not filled with the liquid, includes a first period that is after a meniscus of the liquid is formed in the nozzle and before the liquid reaches the recovery flow path, driving the depressurizing mechanism such that $Pt\_out > -|Pm|$ is satisfied in the first period, where Pm indicates a pressure at which the meniscus of the liquid formed in the nozzle is broken and Pt_out indicates a pressure in the recovery tank.

DESCRIPTION OF EXEMPLARY EMBODIMENTS

Figure 1:
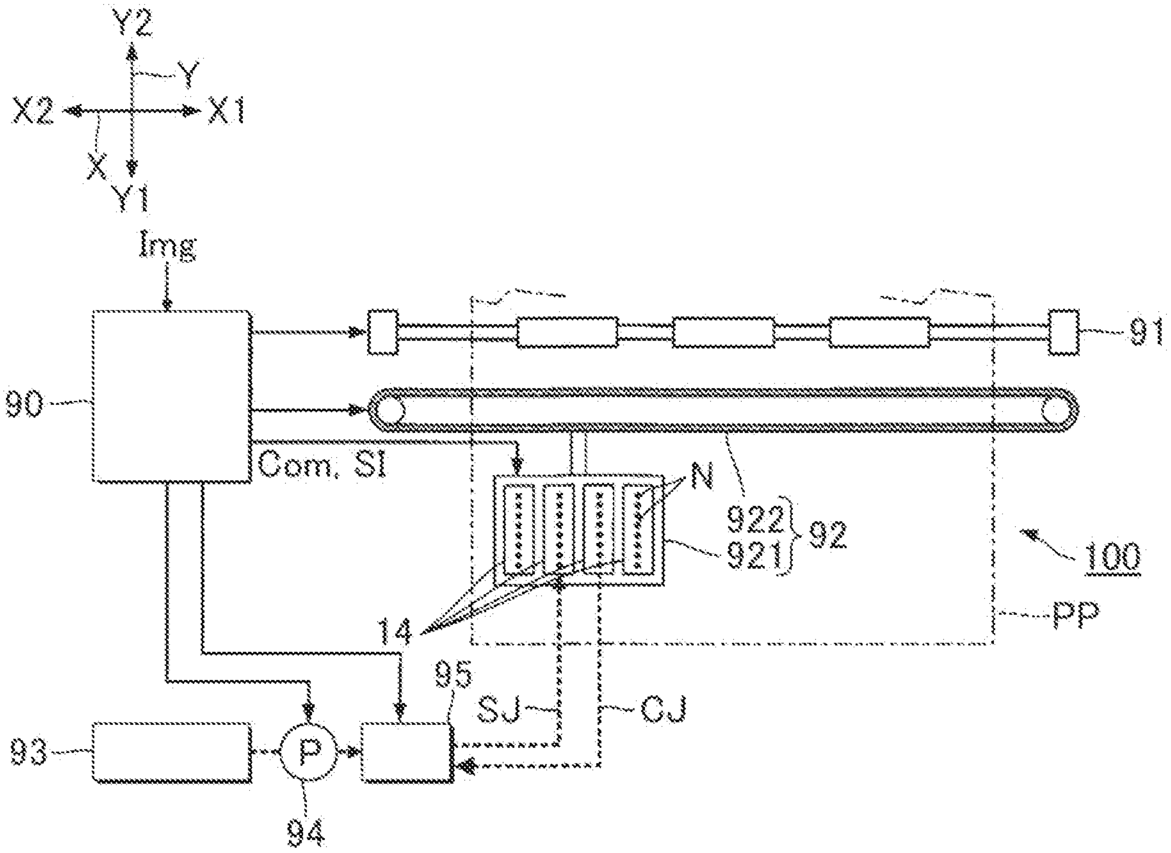
FIG. 1 is a drawing illustrating an example of a liquid ejecting apparatus according to a first embodiment.

Embodiments of the present disclosure are described below with reference to the drawings. In the drawings, the sizes and scales of components may be different from the actual sizes and scales of the components. The embodiments described below are specific examples of the present disclosure and include various limitations. However, the scope of the present disclosure is not limited to those embodiments unless otherwise mentioned.

1. First Embodiment

A liquid ejecting apparatus 100 according to a first embodiment is described below with reference to FIG. 1.

1-1. Outline of Liquid Ejecting Apparatus

FIG. 1 is a drawing illustrating an example of the liquid ejecting apparatus 100 according to the first embodiment. The liquid ejecting apparatus 100 according to the first embodiment is an ink jet printing device that ejects ink onto a medium PP. The medium PP is typically printing paper but may also be any other type of printing medium such as a resin film or a fabric. Here, ink is an example of a "liquid".

As illustrated in FIG. 1, the liquid ejecting apparatus 100 includes a reservoir 93 that stores ink. The reservoir 93 may be implemented by, for example, a cartridge attachable to and detachable from the liquid ejecting apparatus 100, a bag-shaped ink pack formed of a flexible film, or an ink tank that can be refilled with ink. The reservoir 93 may store multiple types of ink with different colors.

As illustrated in FIG. 1, the liquid ejecting apparatus 100 includes multiple liquid ejection heads 14, a controller 90, a conveying mechanism 91, a moving mechanism 92, the reservoir 93, a pump 94, a circulation mechanism 95, a supply flow path SJ, and a recovery flow path CJ. Alternatively, the liquid ejecting apparatus 100 may include only one liquid ejection head 14.

The controller 90 includes a processing circuit, such as a CPU or an FPGA, and a memory circuit, such as a semiconductor memory; and controls components of the liquid ejecting apparatus 100. Here, CPU stands for central processing unit. FPGA stands for field programmable gate array. The controller 90 may include multiple processing circuits.

The conveying mechanism 91 conveys the medium PP in a Y1 direction under the control of the controller 90. In the descriptions below, the Y1 direction and a Y2 direction, which is the opposite of the Y1 direction, are collectively referred to as a Y-axis direction.

The moving mechanism 92, under the control of the controller 90, moves the multiple liquid ejection heads 14 back and forth in an X1 direction and an X2 direction that is the opposite of the X1 direction. In the descriptions below, the X1 direction and the X2 direction may be collectively referred to as an X-axis direction. Here, the X1 direction intersects the Y1 direction. Typically, the X1 direction is orthogonal to the Y1 direction. The moving mechanism 92 includes a housing case 921 that houses the multiple liquid ejection heads 14 and an endless belt 922 to which the housing case 921 is attached. The reservoir 93 may also be housed in the housing case 921 together with the multiple liquid ejection heads 14.

The pump 94 supplies ink stored in the reservoir 93 to the circulation mechanism 95 under the control of the controller 90. The pump 94 is, for example, a tube pump. However, the pump 94 is not limited to a tube pump and may be a diaphragm pump or a syringe pump.

The circulation mechanism 95, under the control of the controller 90, supplies the ink, which is supplied from the reservoir 93 via the pump 94, to the liquid ejection heads 14 via the supply flow path SJ. Also, under the control of the controller 90, the circulation mechanism 95 recovers the ink from the liquid ejection heads 14 via the recovery flow path CJ and causes the recovered ink to flow back to the liquid ejection heads 14. Each of the supply flow path SJ and the recovery flow path CJ is formed of, for example, a flexible tube. The circulation mechanism 95 may instead be controlled by a device other than the controller 90.

The controller 90 receives image data Img indicating an image from a host computer such as a personal computer or a digital camera. Based on the received image data Img, the controller 90 supplies, to each liquid ejection head 14, a drive signal Com for driving the liquid ejection head 14 and a control signal SI for controlling the liquid ejection head 14. Then, the liquid ejection head 14 is driven by the drive signal Com under the control of the control signal SI and ejects ink in a Z2 direction from some or all of nozzles N provided in the liquid ejection head 14. The Z2 direction is orthogonal to the X1 direction and the Y1 direction. In the descriptions below, the Z2 direction and a Z1 direction, which is the opposite of the Z2 direction, may be collectively referred to as a Z-axis direction. In the present embodiment, the Z2 direction is the gravity direction (vertical direction). The nozzles N are described later with reference to FIGS. 3 and 4.

The liquid ejection head 14 performs a print operation in which ink is ejected from some or all of the multiple nozzles N in synchronization with the conveyance of the medium PP by the conveying mechanism 91 and the back-and-forth movement of the liquid ejection head 14 by the moving mechanism 92 so that the ejected ink lands on the surface of the medium PP and thereby forms a desired image on the surface of the medium PP.

Figure 2:
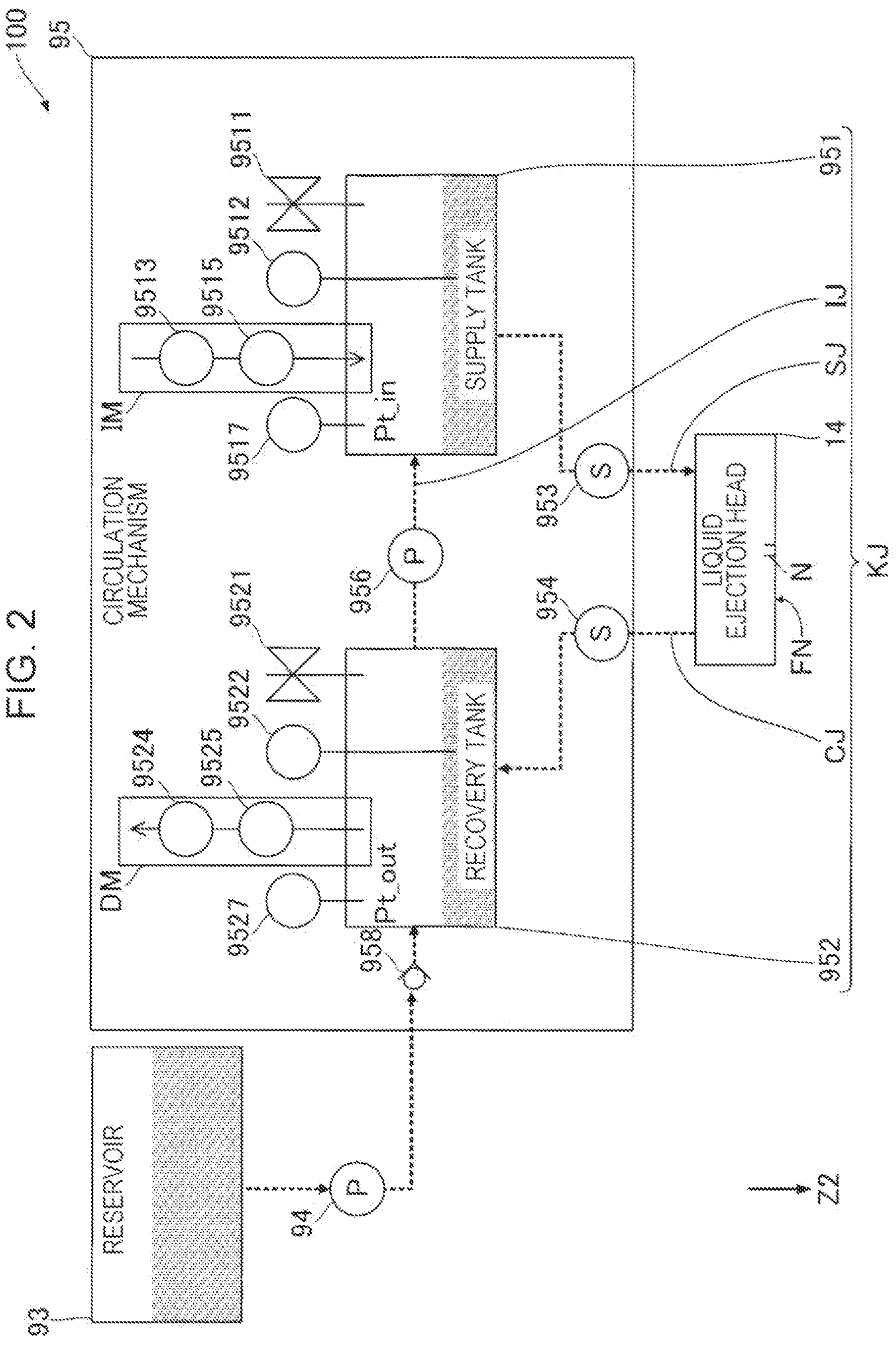
FIG. 2 is a drawing illustrating a circulation mechanism.

FIG. 2 is a drawing illustrating the circulation mechanism 95. As illustrated in FIG. 2, the circulation mechanism 95 includes a supply tank 951, a recovery tank 952, a pressure sensor 953, a pressure sensor 954, a return pump 956, and a check valve 958. In each of FIG. 2 and FIGS. 7, 8, 9, and 12 described later, to facilitate the understanding, the amount of ink stored in each of the supply tank 951, the recovery tank 952, and the reservoir 93 is schematically indicated by a shaded area. Also, in FIGS. 2, 7, 8, 9, and 12, the nozzle N is illustrated in the liquid ejection head 14 to make it easier to discern whether a meniscus of ink is formed in the nozzle N. Also, a nozzle forming surface FN, in which the nozzle N is formed, is illustrated in each of FIGS. 2, 7, 8, 9, and 12. The nozzle forming surface FN is described later with reference to FIGS. 3 and 4.

Each of the supply tank 951 and the recovery tank 952 temporarily stores ink. The supply tank 951 temporarily stores ink to be supplied to each of the multiple liquid ejection heads 14. The supply tank 951 supplies ink to each of the multiple liquid ejection heads 14 via the supply flow path SJ. The recovery tank 952 temporarily stores ink recovered from each of the multiple liquid ejection heads 14. The recovery tank 952 also temporarily stores ink supplied from the reservoir 93. The recovery tank 952 recovers ink from each of the multiple liquid ejection heads 14 via the recovery flow path CJ.

The supply tank 951 is provided with an on-off valve 9511, a liquid level sensor 9512, a pressurizing mechanism IM that pressurizes the inside of the supply tank 951, and a pressure sensor 9517. The recovery tank 952 is provided with an on-off valve 9521, a liquid level sensor 9522, a depressurizing mechanism DM that depressurizes the inside of the recovery tank 952, and a pressure sensor 9527.

The on-off valve 9511, under the control of the controller 90, can close the supply tank 951 and open the supply tank 951 so that the supply tank 951 communicates with the atmosphere. The on-off valve 9521, under the control of the controller 90, can close the recovery tank 952 and open the recovery tank 952 so that the recovery tank 952 communicates with the atmosphere. Each of the on-off valve 9511 and the on-off valve 9521 may be implemented by any type of valve, such as a diaphragm valve, a solenoid valve, or a motorized valve, that can be controlled by a device, such as the controller 90. In the descriptions below, closing the supply tank 951 with the on-off valve 9511 may be expressed as "close the on-off valve 9511", and opening the supply tank 951 with the on-off valve 9511 may be expressed as "open the on-off valve 9511". Similarly, closing the recovery tank 952 with the on-off valve 9521 may be expressed as "close the on-off valve 9521", and opening the recovery tank 952 with the on-off valve 9521 may be expressed as "open the on-off valve 9521".

The liquid level sensor 9512 detects whether the level of ink in the supply tank 951 is greater than or equal to a predetermined height. The liquid level sensor 9522 detects whether the level of ink in the recovery tank 952 is greater than or equal to a predetermined height. Each of the liquid level sensor 9512 and the liquid level sensor 9522 outputs information indicating the detection result to the controller 90.

The pressurizing mechanism IM includes a compressor 9513 and a regulator 9515. The depressurizing mechanism DM includes a vacuum pump 9524 and a regulator 9525.

The compressor 9513 and the vacuum pump 9524 cause a difference between the pressure in the supply tank 951 and the pressure in the recovery tank 952. Specifically, the compressor 9513 generates a positive pressure higher than the atmospheric pressure. The vacuum pump 9524 generates a negative pressure lower than the atmospheric pressure. Here, the pressurizing mechanism IM may include a pump, such as a tube pump, a syringe pump, or a diaphragm pump, in place of the compressor 9513.

The regulator 9515 is disposed between the compressor 9513 and the supply tank 951. The regulator 9515, under the control of the controller 90, adjusts the pressure generated by the compressor 9513 and supplies the adjusted pressure to the supply tank 951. In the descriptions below, the pressure in the supply tank 951 may be indicated by Pt_in.

The regulator 9525 is disposed between the vacuum pump 9524 and the recovery tank 952. The regulator 9525, under the control of the controller 90, adjusts the pressure generated by the vacuum pump 9524 and supplies the adjusted pressure to the recovery tank 952. In the descriptions below, the pressure in the recovery tank 952 may be indicated by Pt_out.

The pressure sensor 9517 measures the pressure Pt_in in the supply tank 951. The pressure sensor 9527 measures the pressure Pt_out in the recovery tank 952. Each of the pressure sensor 9517 and the pressure sensor 9527 sends measurement information indicating the measured pressure to the controller 90.

The return pump 956 is disposed in a relay flow path IJ through which the supply tank 951 communicates with the recovery tank 952. The return pump 956 is, for example, a tube pump. The return pump 956, under the control of the controller 90, sends ink in the recovery tank 952 to the supply tank 951 via the relay flow path IJ.

The pressure sensor 953 measures the pressure in the supply flow path SJ. The pressure sensor 954 measures the pressure in the recovery flow path CJ. Each of the pressure sensor 953 and the pressure sensor 954 sends measurement information indicating the measured pressure to the controller 90. The pressure sensor 954 is an example of a "detector".

The check valve 958 prevents the backflow of ink supplied from the reservoir 93 to the recovery tank 952.

As described above, under the control of the controller 90, the liquid ejecting apparatus 100 performs a circulation operation in which the pressure Pt_in in the supply tank 951 is made higher than the pressure Pt_out in the recovery tank 952 to cause the ink to circulate through a circulation path KJ including the liquid ejection head 14, the supply tank 951, the supply flow path SJ, the recovery tank 952, the recovery flow path CJ, and the relay flow path IJ. When the circulation operation is performed, the ink flows from the supply tank 951 via the supply flow path SJ into the liquid ejection head 14, the ink is recovered from the liquid ejection head 14 via the recovery flow path CJ to the recovery tank 952, and the ink is caused by the return pump 956 to flow from the recovery tank 952 via the relay flow path IJ to the supply tank 951. Thus, the ink is circulated. The circulation operation is divided into a first circulation operation and a second circulation operation. The flow rate in the first circulation operation is greater than the flow rate in the second circulation operation.

1-2. Outline of Liquid Ejection Head

Figure 3:
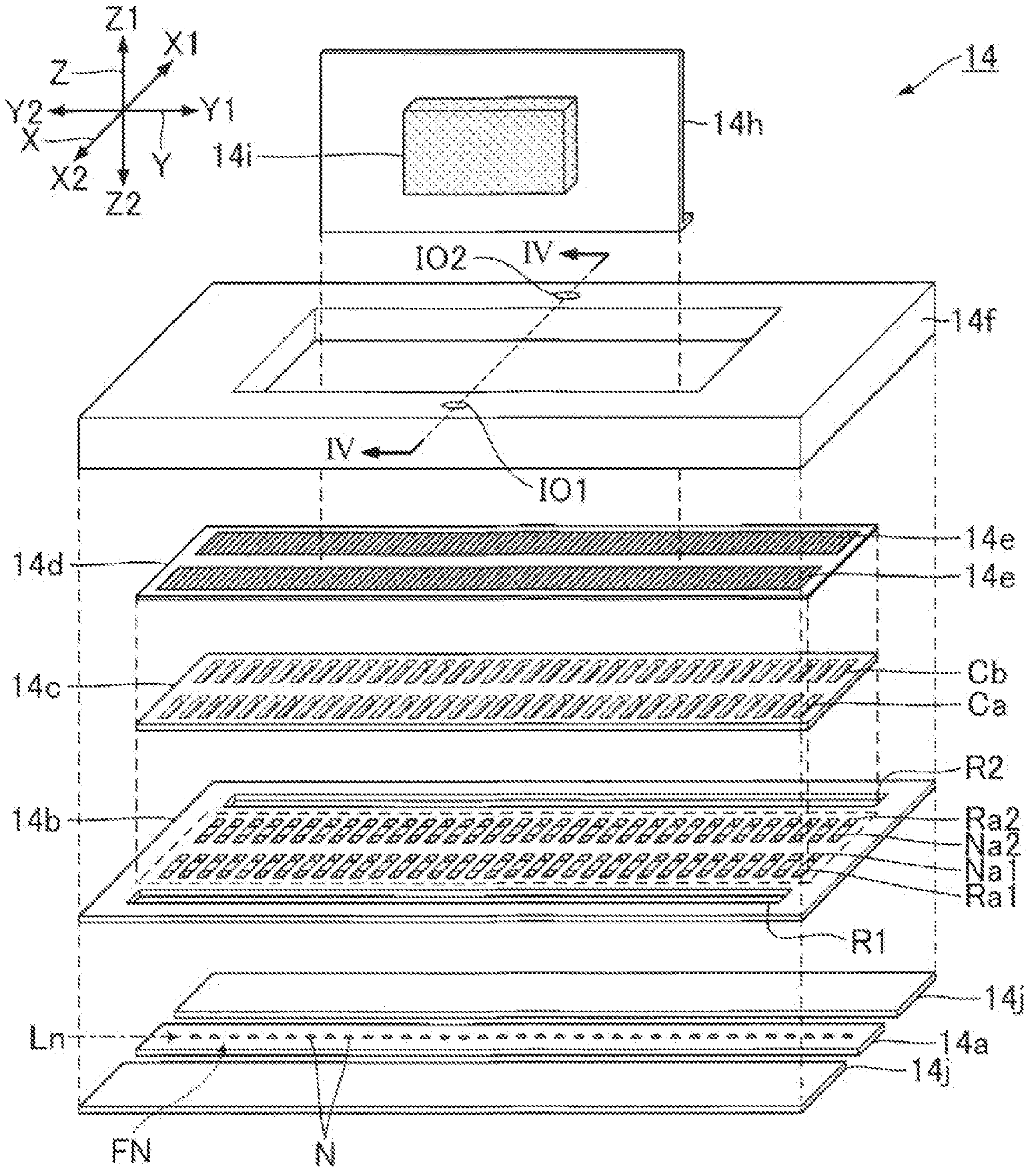
FIG. 3 is an exploded perspective view of a liquid ejection head.
Figure 4:
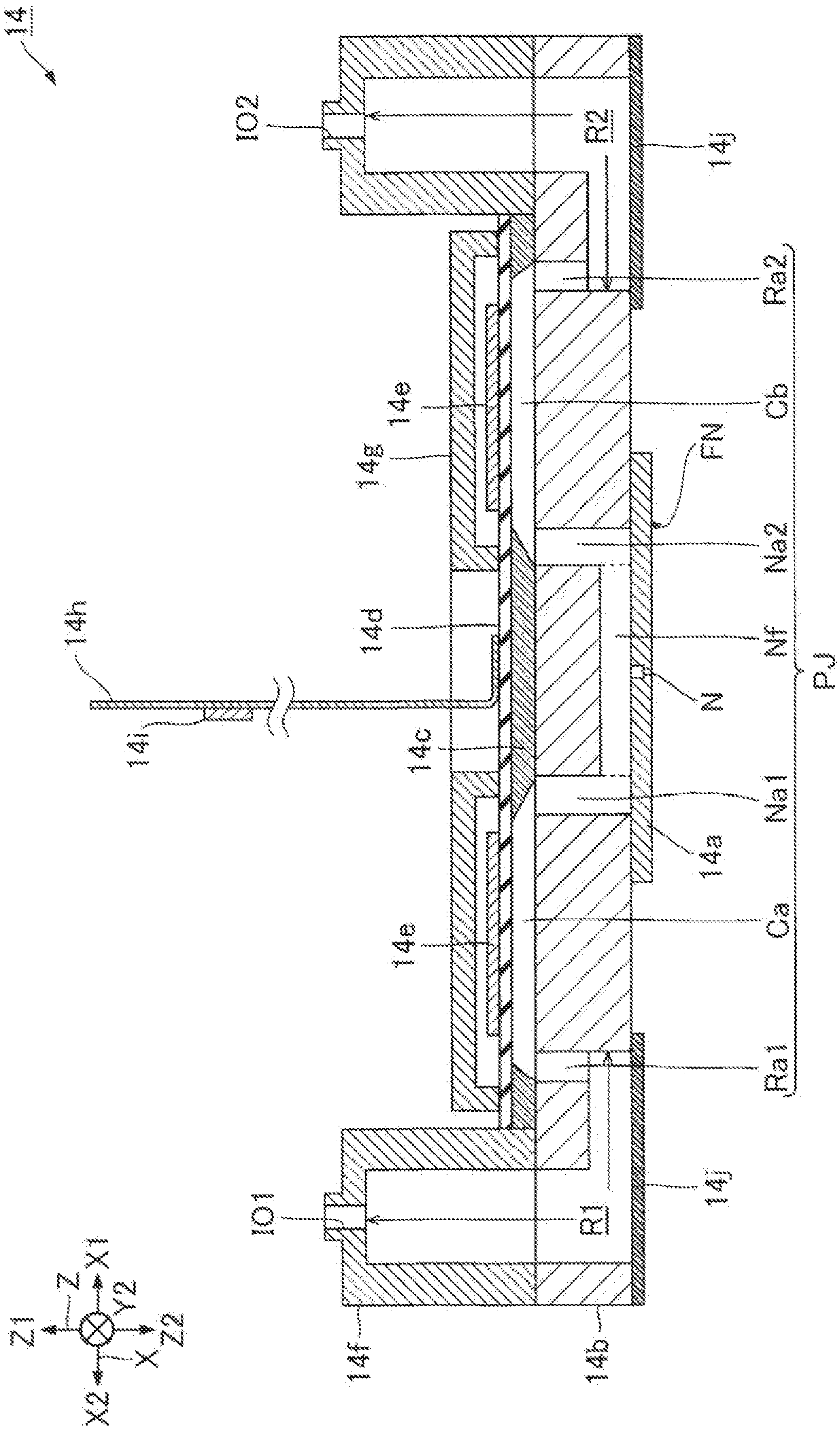
FIG. 4 is a cross-sectional view taken along line IV-IV of FIG. 3.

FIG. 3 is an exploded perspective view of the liquid ejection head 14. FIG. 4 is a cross-sectional view taken along line IV-IV of FIG. 3. Line IV-IV is a virtual line segment that is parallel to the X-axis and passes through a nozzle flow path Nf.

As illustrated in FIGS. 3 and 4, the liquid ejection head 14 includes a nozzle substrate **14*a*, a flow path substrate 14*b*, a pressure chamber substrate 14*c*, a vibration plate 14*d*, multiple piezoelectric elements 14*e*, a case 14*f*, a protective plate 14*g*, a wiring substrate 14*h*, and vibration absorbers 14*j***.

As illustrated in FIGS. 3 and 4, the nozzle substrate **14*a*, the flow path substrate 14*b*, the pressure chamber substrate 14*c*, and the vibration plate 14*d*** are stacked in this order in the Z1 direction. Each of these components extends along the Y-axis and is manufactured by, for example, processing a single-crystal substrate of silicon using a semiconductor processing technology. Also, these components are joined to each other with, for example, an adhesive. Another layer, such as an adhesive layer, or a substrate may be interposed between any two adjacent components among these components as necessary.

Multiple nozzles N are formed in the nozzle substrate **14*a*. Each of the multiple nozzles N is a through hole that passes through the nozzle substrate 14*a* and through which ink passes. The multiple nozzles N are arranged in the Y-axis direction. The multiple nozzles N form a nozzle array Ln that is parallel to the Y-axis. The nozzle substrate 14*a* has the nozzle forming surface FN in which the multiple nozzles N are formed. The nozzle forming surface FN is one of the two surfaces of the nozzle substrate 14*a*** and faces the Z2 direction.

In the flow path substrate **14*b*, parts of a first common liquid chamber R1 and a second common liquid chamber R2 and parts of individual flow paths PJ excluding pressure chambers Ca and pressure chambers Cb are formed. That is, in the flow path substrate 14*b*, nozzle flow paths Nf, first communication flow paths Na1, second communication flow paths Na2, individual supply flow paths Ra1, and individual discharge flow paths Ra2** are formed.

Parts of the first common liquid chamber R1 and the second common liquid chamber R2 are spaces that pass through the flow path substrate **14*b***. The vibration absorbers

**14*j* closing the openings of the spaces are disposed on a surface of the flow path substrate 14*b*** facing the Z2 direction.

The vibration absorber **14*j* is a layer formed of an elastic material. The vibration absorbers 14*j* form parts of the wall surfaces of the first common liquid chamber R1 and the second common liquid chamber R2 and absorb the pressure variations in the first common liquid chamber R1 and the second common liquid chamber R2**.

Each nozzle flow path Nf is a space in a groove formed in a surface of the flow path substrate **14*b* facing the Z2 direction. Here, the nozzle substrate 14*a*** forms a part of the wall surface of the nozzle flow path Nf.

Each of the first communication flow paths Na1 and the second communication flow paths Na2 is a space passing through the flow path substrate **14*b***.

Each of the individual supply flow paths Ra1 and the individual discharge flow paths Ra2 is a space passing through the flow path substrate **14*b*. Each individual supply flow path Ra1 allows the first common liquid chamber R1 to communicate with the corresponding pressure chamber Ca and supplies ink from the first common liquid chamber R1 to the pressure chamber Ca. Here, one end of the individual supply flow path Ra1 is open on a surface of the flow path substrate 14*b* facing the Z1 direction. On the other hand, another end of the individual supply flow path Ra1 is at the upstream end of the individual flow path PJ and is open on the wall surface of the first common liquid chamber R1 in the flow path substrate 14*b*. Each individual discharge flow path Ra2 allows the second common liquid chamber R2 to communicate with the corresponding pressure chamber Cb and discharges ink from the pressure chamber Cb to the second common liquid chamber R2. Here, one end of the individual discharge flow path Ra2 is open on a surface of the flow path substrate 14*b* facing the Z1 direction. On the other hand, another end of the individual discharge flow path Ra2 is at the downstream end of the individual flow path PJ and is open on the wall surface of the second common liquid chamber R2 in the flow path substrate 14*b***.

In the pressure chamber substrate **14*c*, the pressure chambers Ca and the pressure chambers Cb of the multiple individual flow paths PJ are formed. Each of the pressure chambers Ca and the pressure chambers Cb passes through the pressure chamber substrate 14*c* and is a space between the flow path substrate 14*b* and the vibration plate 14*d***.

The vibration plate **14*d* is a plate-like part that can elastically vibrate. The vibration plate 14*d* is, for example, a multilayer structure including a first layer comprised of silicon oxide and a second layer comprised of zirconium oxide. Here, another layer comprised of, for example, metal oxide may be interposed between the first layer and the second layer. A part or the entirety of the vibration plate 14*d* may be integrated with and comprised of the same material as the pressure chamber substrate 14*c*. For example, the vibration plate 14*d* and the pressure chamber substrate 14*c* may be formed as a monolithic structure by selectively and partially removing, in the thickness direction, areas corresponding to the pressure chambers C of a plate-like material with a predetermined thickness. Also, the vibration plate 14*d*** may be comprised of a layer of a single material.

Multiple piezoelectric elements **14*e* corresponding to different pressure chambers C are provided on a surface of the vibration plate 14*d* facing the Z1 direction. Each piezoelectric element 14*e* has, for example, a multilayer structure including a first electrode and a second electrode that face each other and a piezoelectric layer disposed between the first and second electrodes. The piezoelectric element 14*e* changes the pressure of ink in the pressure chamber C and thereby causes the ink in the pressure chamber C to be ejected from the nozzle N. When the drive signal Com is supplied, the piezoelectric element 14*e* deforms and thereby causes the vibration plate 14*d* to vibrate. This vibration causes the pressure chamber C to expand and contract and as a result, the pressure of ink in the pressure chamber C changes. The piezoelectric element 14*e* is an example of a driven element. Here, the liquid ejection head 14 may include heating elements instead of the piezoelectric elements 14*e***.

The case **14*f* stores ink. The case 14*f* forms spaces that constitute remaining parts of the first common liquid chamber R1 and the second common liquid chamber R2 other than the parts formed in the flow path substrate 14*b*. Also, the case 14*f* includes an inlet IO1 communicating with the first common liquid chamber R1 and an outlet 102 communicating with the second common liquid chamber R2. Ink is supplied to the first common liquid chamber R1 via the inlet IO1. Also, ink stored in the second common liquid chamber R2 is recovered via the outlet 102**.

The protective plate **14*g* is a plate-like part disposed on a surface of the vibration plate 14*d* facing the Z1 direction, protects the multiple piezoelectric elements 14*e*, and increases the mechanical strength of the vibration plate 14*d*. Here, a space for housing the multiple piezoelectric elements 14*e* is formed between the protective plate 14*g* and the vibration plate 14*d***.

The wiring substrate **14*h* is mounted on a surface of the vibration plate 14*d* facing the Z1 direction and is a component for electrically connecting the controller 90 to the liquid ejection head 14. The wiring substrate 14*h* may be a flexible component such as a flexible printed circuit (FPC) or a flexible flat cable (FFC). A drive circuit 14*i* is mounted on the wiring substrate 14*h***.

In the liquid ejection head 14 configured as described above, when the circulation mechanism 95 is driven, ink is circulated through the first common liquid chamber R1, the individual supply flow path Ra1, the pressure chamber Ca, the nozzle flow path Nf, the pressure chamber Cb, the individual discharge flow path Ra2, and the second common liquid chamber R2 in this order.

Also, the drive signal Com from the drive circuit **14*i* simultaneously drives the piezoelectric elements 14*e*** corresponding to the pressure chamber Ca and the pressure chamber Cb to change the pressures in the pressure chamber Ca and the pressure chamber Cb. As a result of the changes in the pressures, ink is ejected from the nozzle N.

1-3. Filling Process

When filling, with ink, the nozzle N, the individual flow path PJ, the first common liquid chamber R1, the second common liquid chamber R2, the supply flow path SJ, and the recovery flow path CJ that are not filled with ink, the nozzle N, the individual flow path PJ, the first common liquid chamber R1, the second common liquid chamber R2, the supply flow path SJ, and the recovery flow path CJ may be filled with ink by adjusting the pressure in the supply tank 951 to a positive pressure and adjusting the pressure in the recovery tank 952 to a negative pressure as in the circulation operation. However, the pressure loss in the recovery flow path CJ observed when the recovery flow path CJ is not filled with ink is very small compared to the pressure loss observed when the recovery flow path CJ is filled with ink. More precisely, although pressure loss of air occurs, the pressure loss of air is very small compared to the pressure loss of a liquid. Also, when the recovery flow path CJ is not filled with ink, no pressure acting on the nozzle N is generated by the head difference between the liquid level in the recovery tank 952 and the meniscus in the nozzle N. Accordingly, when a meniscus of ink is formed in the nozzle N but the recovery flow path CJ is not filled with ink, a pressure that is substantially the same as the pressure in the recovery tank 952 acts on the meniscus formed in the nozzle N. When a pressure that differs from the atmospheric pressure by a predetermined amount acts on the meniscus, the meniscus is broken. The pressure at which the meniscus is broken is determined by the surface tension of ink and the perimeter of the hole of the nozzle N. In the descriptions below, the pressure at which the meniscus is broken is referred to as a meniscus breaking pressure. "Pressure" in the descriptions below indicates a pressure relative to the atmospheric pressure unless otherwise mentioned. When a pressure that is relative to the atmospheric pressure and greater than or equal to the meniscus breaking pressure acts on the meniscus and when a pressure that is relative to the atmospheric pressure and less than or equal to the meniscus breaking pressure acts on the meniscus, the meniscus is broken.

When Pm indicates the meniscus breaking pressure, N indicates the surface tension of ink, D indicates the nozzle hole diameter, and π indicates pi, the meniscus breaking pressure Pm is expressed by formula (1) below.

$$Pm=N/(\pi D) \quad (1)$$

In the circulation operation, because the pressure loss occurs in the recovery flow path CJ and formula (2) below is satisfied, ink is circulated without breaking the meniscus.

$$|\text{Pressure acting on meniscus}|<|Pm| \quad (2)$$

Here, |x| means the absolute value of x. Formula (2) can be transformed into formula (2-1) when the pressure acting on the meniscus is a positive pressure and can be transformed into formula (2-2) when the pressure acting on the meniscus is a negative pressure.

$$\text{Pressure acting on meniscus}<|Pm| \quad (2\text{-}1)$$

$$\text{Pressure acting on meniscus}>-|Pm| \quad (2\text{-}2)$$

In contrast, in a state where ink has not reached the recovery flow path CJ after the meniscus is formed in the nozzle N, the pressure acting on the meniscus in the nozzle N can be considered to be substantially the same as the pressure Pt_out in the recovery tank 952. When formula (3) below is satisfied, the meniscus is broken.

$$|Pt\_\text{out}|\geq|Pm| \quad (3)$$

When the breaking and the formation of the meniscus are repeated, air bubbles may be drawn into the flow path in the liquid ejection head 14. When the air bubbles enter ink, the supply of ink becomes insufficient or an ejection failure occurs. The ejection failure indicates a state in which even when the drive signal Com is supplied to eject ink from the nozzle N, ink cannot be ejected in a manner defined by the drive signal Com. When ink is ejected from the nozzle N and the pressure in the individual flow path PJ becomes negative, the negative pressure draws ink from the first common liquid chamber R1 and the second common liquid chamber R2. However, the negative pressure not only draws ink from the first common liquid chamber R1 and the second common liquid chamber R2 but also draws the air bubbles remaining in the first common liquid chamber R1 and the second common liquid chamber R2 into the individual flow path PJ, and the air bubbles clog the nozzle N and cause the ejection failure. To prevent the meniscus from being broken, formula (3) should not be satisfied, that is, formula (4) below denying the formula (3) needs to be satisfied.

$$|Pt\_\text{out}|<|Pm| \quad (4)$$

Here, Pt_out is a negative value. Therefore, formula (5) below is derived from formula (4).

$$0\ [\text{kPa}]>Pt\_\text{out}>-|Pm| \quad (5)$$

Here, [kPa] means kilopascal, which is a unit of pressure. In the first embodiment, in a state in which ink has not reached the recovery flow path CJ after the meniscus of ink is formed in the nozzle N, the controller 90 controls the circulation mechanism 95 such that formula (5) is satisfied. Satisfying formula (5) makes it possible to prevent the already formed meniscus from being broken and thereby makes it possible to prevent the air bubbles from being drawn into the liquid ejection head 14.

1-4. Operation of Controller

Figure 5:
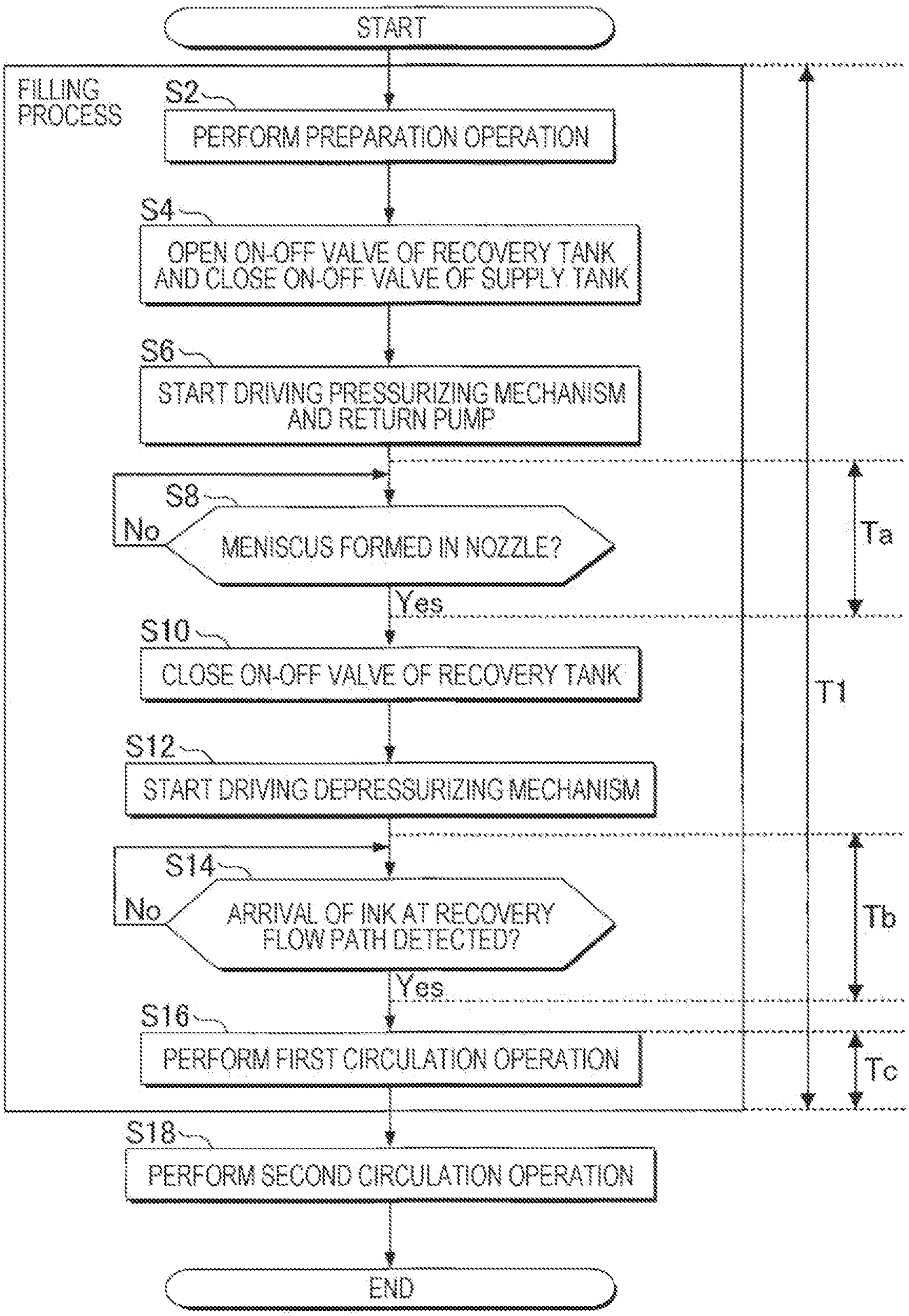
FIG. 5 is a flowchart illustrating a process performed by a controller to fill flow paths with ink.

FIG. 5 is a flowchart illustrating a process performed by the controller 90 to fill flow paths with ink. As illustrated in FIG. 5, to fill the flow path in the liquid ejection head 14 including the nozzle N, the supply flow path SJ, and the recovery flow path CJ with ink, the controller 90 performs a filling process and the second circulation operation in this order. As the filling process, the controller 90 performs steps S2, S4, S6, S8, S10, S12, S14, and S16 in this order. As illustrated in FIG. 5, the period in which the filling process is performed is referred to as a filling period T1. In the filling period T1, Ta indicates a period from before the meniscus of ink is formed in the nozzle N until the meniscus of ink is formed in the nozzle N. In the filling period T1, Tb indicates a period after the period Ta until ink reaches the recovery flow path CJ after the meniscus of ink is formed in the nozzle N. Also, in the filling period T1, Tc indicates a period that is after the period Tb and in which the first circulation operation is performed after ink reaches the recovery flow path CJ. Here, the period Ta is an example of a "second period". The period Tb is an example of a "first period". The period Tc is an example of a "fourth period".

At step S2, the controller 90 performs a preparation operation as one of the operations in the filling process by controlling the circulation mechanism 95. The preparation operation is described below with reference to FIG. 6.

Figure 6:
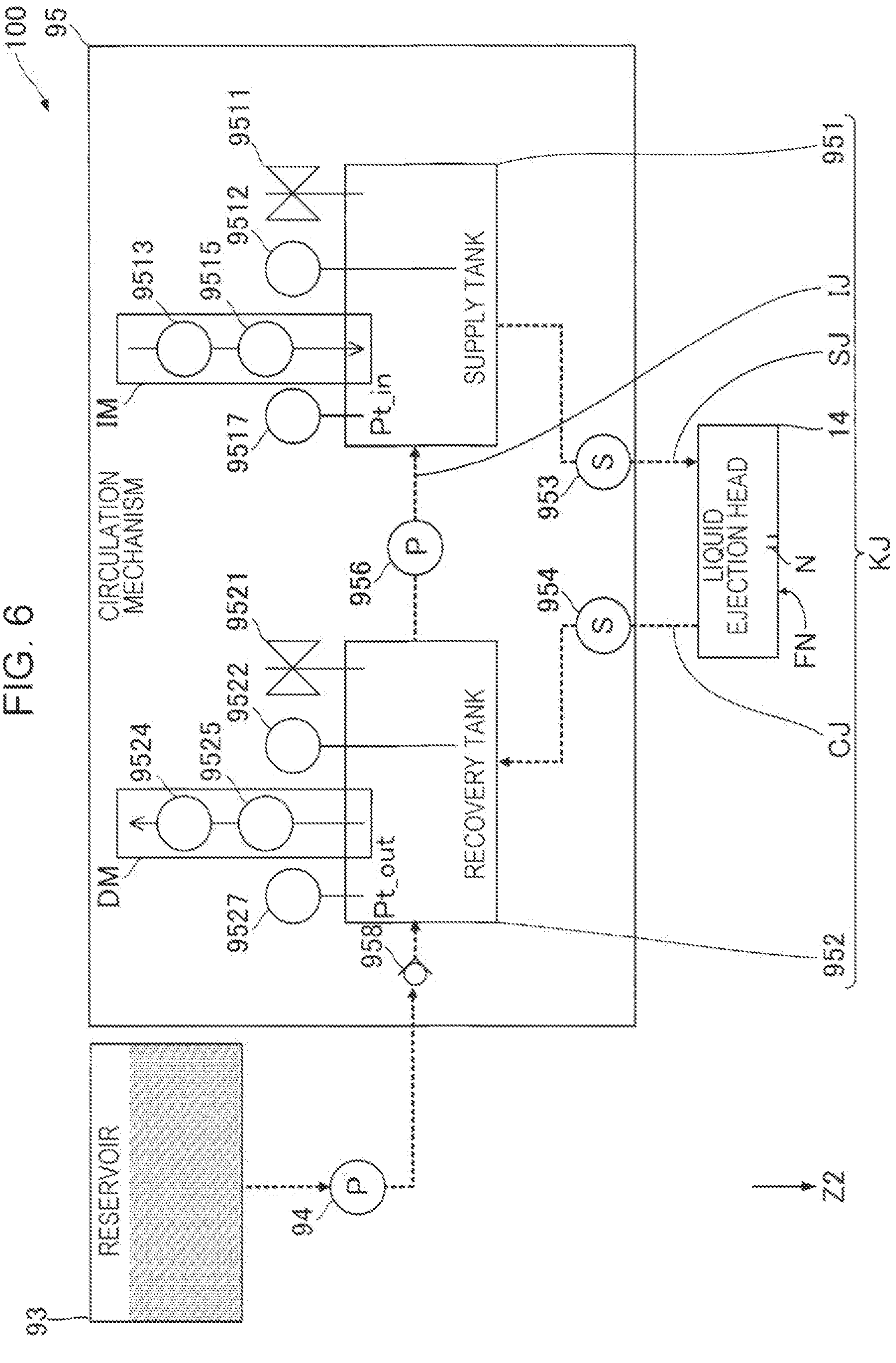
FIG. 6 is a drawing for describing a preparation operation.

FIG. 6 is a drawing for describing the preparation operation. In an initial state illustrated in FIG. 6, ink is stored only in the reservoir 93, and ink is not stored in the supply tank 951 and the recovery tank 952. While performing the preparation operation, the controller 90 keeps the on-off valve 9521 and the on-off valve 9511 open. In the preparation operation, the controller 90 controls the pump 94 to send the ink stored in the reservoir 93 to the recovery tank 952. Next, the controller 90 controls the return pump 956 to send the ink from the recovery tank 952 to the supply tank 951. After sending a certain amount of ink to the supply tank 951, the controller 90 ends the preparation operation. Here, at the end of the preparation operation, ink may or may not be stored in the recovery tank 952.

Referring back to FIG. 5, after step S2, the controller 90 performs steps S4, S6, S8, S10, S12, S14, and S16 in this order as the filling process. At step S4, the controller 90 opens the on-off valve 9521 of the recovery tank 952 and closes the on-off valve 9511 of the supply tank 951. Then, at step S6, the controller 90 starts driving the pressurizing mechanism IM and the return pump 956. The time at which Pt_in satisfies formula (a-3) described later after the pressurizing mechanism IM is started to be driven corresponds to the start time of the period Ta. Here, the timing at which the return pump 956 is started to be driven is not limited to step S6. The return pump 956 may be started to be driven before step S16 described later at the latest, and may be started to be driven at, for example, step S12 described later. Next, the state of the liquid ejecting apparatus 100 in the period Ta is described with reference to FIG. 7.

Figure 7:
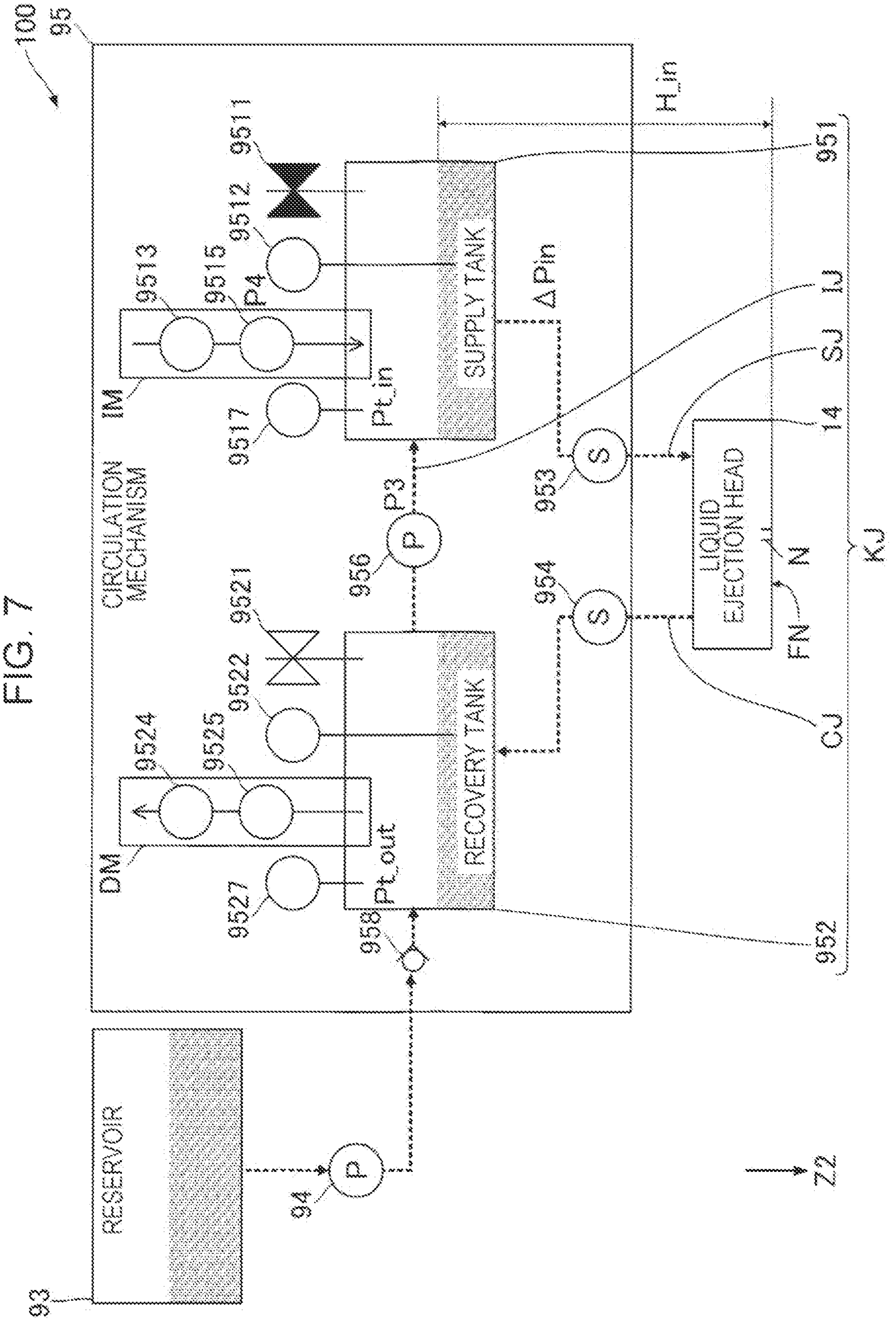
FIG. 7 is a drawing illustrating a state of the liquid ejecting apparatus in a period Ta.

FIG. 7 is a drawing illustrating the state of the liquid ejecting apparatus 100 in the period Ta. In the period Ta, the on-off valve 9521 is open and the on-off valve 9511 is closed. In FIG. 7 and FIGS. 8, 9, and 12 described later, to facilitate the understanding, the on-off valve 9511 in the open state is indicated by an outline figure, and the on-off valve 9511 in the closed state is indicated by a solid figure. The same applies to the on-off valve 9521.

In the period Ta, by satisfying formula (2), the meniscus can be prevented from being broken. The pressure acting on the meniscus is expressed by formula (a-1) below by using the pressure Pt_in in the supply tank 951, an absolute value ΔPin of pressure loss between the supply tank 951 and the nozzle N, and a pressure Ph_in that acts on the nozzle N due to the head difference between the liquid level in the supply tank 951 and the nozzle N.

$$\text{Pressure acting on meniscus} = Pt\_\text{in} - \Delta P\text{in} \pm |Ph\_\text{in}| \quad \text{(a-1)}$$

Formula (a-1) can be transformed into formula (a-1-1) below when the liquid level in the supply tank 951 is located away from the nozzle N in a direction (Z1 direction) opposite the vertical direction and can be transformed into formula (a-1-2) below when the liquid level in the supply tank 951 is located away from the nozzle N in the vertical direction (Z2 direction).

$$\text{Pressure acting on meniscus} = Pt\_\text{in} - \Delta P\text{in} + |Ph\_\text{in}| \quad \text{(a-1-1)}$$

$$\text{Pressure acting on meniscus} = Pt\_\text{in} - \Delta P\text{in} - |Ph\_\text{in}| \quad \text{(a-1-2)}$$

Here, when H_in indicates the distance (head difference) in the vertical direction between the nozzle forming surface FN and the liquid level in the supply tank 951 and g indicates gravitational acceleration, the absolute value of the pressure Ph_in is expressed by formula (6) below.

$$|Ph\_\text{in}| = H\_\text{in} \times g \quad (6)$$

Also, considering that the ink is caused to flow toward the recovery tank 952, the pressure acting on the meniscus is greater than 0 [kPa]. Formula (a-2) below is obtained by considering the fact that the pressure acting on the meniscus is greater than 0 [kPa] and by substituting the right-hand side of formula (a-1) into the left-hand side of formula (2-1).

$$0\ [\text{kPa}] < Pt\_\text{in} - \Delta P\text{in} \pm |Ph\_\text{in}| < |Pm| \quad \text{(a-2)}$$

By applying equivalence transformation to formula (a-2), formula (a-3) below is obtained.

$$(-\Delta P\text{in} \pm |Ph\_\text{in}|) < Pt\_\text{in} < |Pm| - (-\Delta P\text{in} \pm |Ph\_\text{in}|) \quad \text{(a-3)}$$

For example, when the liquid level in the supply tank 951 is located away from the nozzle N in the direction (direction Z1) opposite the vertical direction as illustrated in FIG. 7 and when Ph_in is +1 [kPa], ΔPin is 12 [kPa], and |Pm| is 1 [kPa], formula (a-4) below can be obtained by substituting these values into the corresponding terms in formula (a-3).

$$-(-12\ [\text{kPa}] + 1\ [\text{kPa}]) < Pt\_\text{in} < 1\ [\text{kPa}] - (-12\ [\text{kPa}] + 1) \text{--->} 11\ [\text{kPa}] < Pt\_\text{in} < 12\ [\text{kPa}] \quad \text{(a-4)}$$

At step S6, the controller 90 drives the pressurizing mechanism IM and adjusts the pressure set by the regulator 9515 according to formula (a-4) so that the pressure measured by the pressure sensor 9517 becomes greater than 11 [kPa] and less than 12 [kPa]. Here, in the period Ta, because the on-off valve 9521 is open, Pt_out is [kPa].

Specific examples of pressures set by the regulator 9515 are described below. When P3 indicates a positive pressure applied by the return pump 956 to the supply tank 951 and P4 indicates a pressure set by the regulator 9515, formula (a-5) below is satisfied.

$$Pt\_\text{in} = P3 + P4 \quad \text{(a-5)}$$

Formula (a-6) below is obtained by substituting the right-hand side of formula (a-5) into Pt_in in formula (a-4) and applying equivalence transformation to the resulting formula.

$$11\ [\text{kPa}] - P3 < P4 < 12\ [\text{kPa}] - P3 \quad \text{(a-6)}$$

For example, P3 is from 0.2 [kPa] to 0.5 [kPa] when the return pump 956 is being driven and is 0 [kPa] when the return pump 956 is not being driven. For example, when P3 is 0.2 [kPa], P4 is greater than 10.8 [kPa] and less than 11.8 [kPa] according to formula (a-6). Also, when P3 is 0.5 [kPa], P4 is greater than 10.5 [kPa] and less than 11.5 [kPa] according to formula (a-6).

Referring back to FIG. 5, after step S6, the controller 90 determines, at step S8, whether the meniscus of ink has been formed in the nozzle N. Specifically, the controller 90 determines that the meniscus of ink has been formed in the nozzle N when a first predetermined period has passed after the driving of the pressurizing mechanism IM is started. The first predetermined period is obtained by, for example, adding a margin representing a tolerance to a period obtained by an experiment performed by the manufacturer of the liquid ejecting apparatus 100.

When the determination result of step S8 is negative, the controller 90 performs step S8 again after a predetermined period of time.

When the determination result of step S8 is affirmative, the controller 90, at step S10, closes the on-off valve 9521 of the recovery tank 952. The time at which the determination result of step S8 becomes affirmative corresponds to the end of the period Ta. After step S10, the controller 90, at step S12, starts driving the depressurizing mechanism DM. The time at which Pt_out satisfies formula (5) after the driving of the depressurizing mechanism DM is started corresponds to the start of the period Tb. The state of the liquid ejecting apparatus 100 in the period Tb is described below with reference to FIG. 8.

Figure 8:
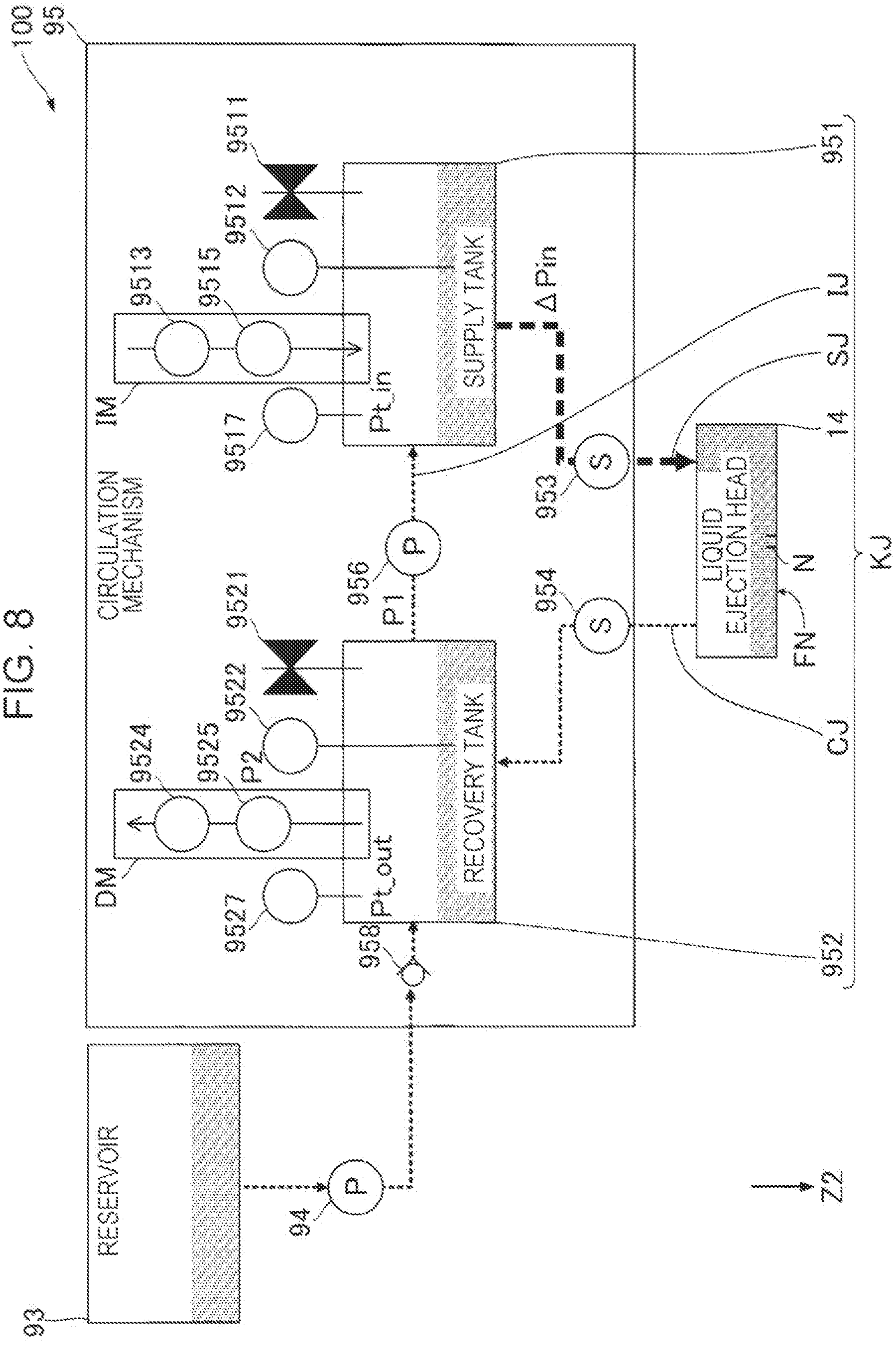
FIG. 8 is a drawing illustrating a state of the liquid ejecting apparatus in a period Tb.

FIG. 8 is a drawing illustrating the state of the liquid ejecting apparatus 100 in the period Tb. In the period Tb, because the supply flow path SJ has been filled with ink and the ink has reached the nozzle N, the meniscus of ink is formed in the nozzle N. In FIG. 8, a thick arrow is used for the supply flow path SJ to indicate that the supply flow path SJ has been filled with ink. Also, in FIG. 8, the shading applied to a part of the flow path in the liquid ejection head 14 indicates that the part of the flow path in the liquid ejection head 14 has been filled with ink. Furthermore, in FIG. 8, the shading in the nozzle N indicates that the meniscus of ink has been formed in the nozzle N.

In the period Tb, when formula (5) is satisfied, the meniscus is prevented from being broken. When |Pm| is 1 [kPa], formula (b-1) below is obtained by substituting 1 [kPa] into |Pm| in formula (5).

$$0\ [\text{kPa}] > Pt\_\text{out} > -1\ [\text{kPa}] \quad \text{(b-1)}$$

At step S12, the controller 90 drives the depressurizing mechanism DM and adjusts the pressure set by the regulator

9525 according to formula (b-1) so that the pressure measured by the pressure sensor 9527 falls in a range between 0 [kPa] and −1 [kPa]. Also, in the period Tb, the controller 90 drives and controls the pressurizing mechanism IM in the same manner as in the period Ta.

Specific examples of pressures set by the regulator 9525 are described below. When P1 indicates a negative pressure applied by the return pump 956 to the recovery tank 952 and P2 indicates a pressure set by the regulator 9525, formula (b-2) below is satisfied.

$$Pt\_out = P1 + P2 \qquad \text{(b-2)}$$

Formula (b-3) below can be derived by substituting the right-hand side of formula (b-2) into Pt_out in formula (b-1) and applying equivalence transformation to the resulting formula.

$$-P1 > P2 > -1\ [\text{kPa}] - P1 \qquad \text{(b-3)}$$

P1 is, for example, from −0.2 [kPa] to −0.5 [kPa] when the return pump 956 is being driven and is 0 [kPa] when the return pump 956 is not being driven. For example, when P1 is −0.2 [kPa], P2 is less than 0.2 [kPa] and greater than −0.8 [kPa] according to formula (b-3). Also, when P1 is −0.5 [kPa], P2 is less than 0.5 [kPa] and greater than −0.5 [kPa] according to formula (b-3).

Referring back to FIG. 5, after step S12, the controller 90, at step S14, determines whether ink has reached the recovery flow path CJ based on the measurement result of the pressure sensor 954. As described above, the pressure loss in the recovery flow path CJ when the recovery flow path CJ is not filled with ink is very small compared to the pressure loss when the recovery flow path CJ is filled with ink. Therefore, when the number of digits of the pressure measured by the pressure sensor 954 changes greatly, the pressure sensor 954 can detect that ink has reached the recovery flow path CJ. The pressure sensor 953 sends, as measurement information, information indicating whether ink has reached the recovery flow path CJ to the controller 90. When the determination result of step S14 is negative, the controller 90 performs step S14 again after a predetermined period of time.

When the determination result of step S14 is affirmative, the controller 90 performs the first circulation operation at step S16. The time at which the determination result of step S14 becomes affirmative corresponds to the end of the period Tb. In the first circulation operation, the time at which Pt_in satisfies formula (c-2) described later and Pt_out satisfies formula (c-5) described later corresponds to the start of the period Tc. The state of the liquid ejecting apparatus 100 in the period Tc is described below with reference to FIG. 9.

Figure 9:
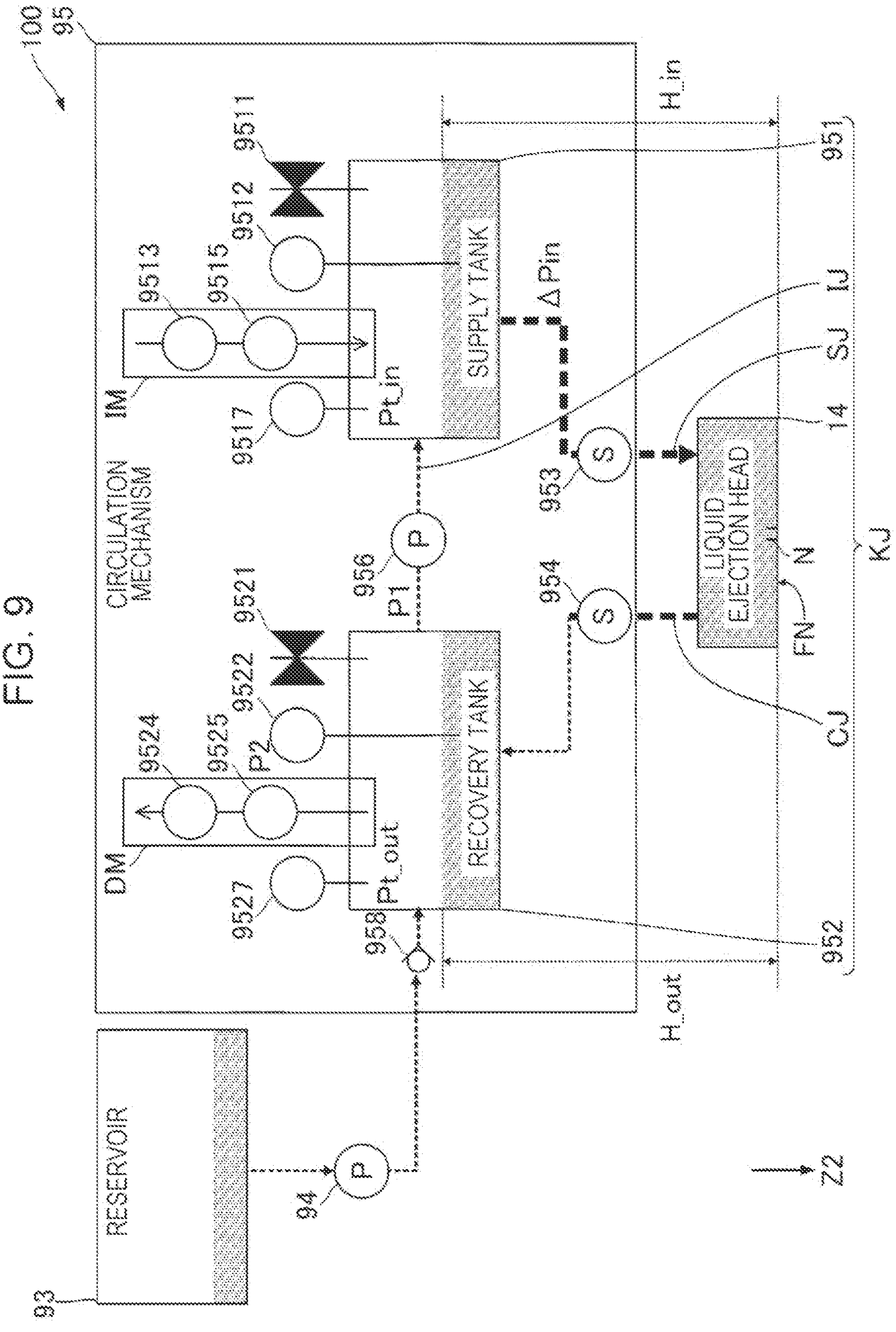
FIG. 9 is a drawing illustrating a state of the liquid ejecting apparatus in a period Tc.

FIG. 9 is a drawing illustrating the state of the liquid ejecting apparatus 100 in the period Tc. In the period Tc, the supply flow path SJ and the flow path in the liquid ejection head 14 have been filled with ink, and ink has reached the position where the pressure sensor 954 of the recovery flow path CJ is provided. In FIG. 9, the shading applied to the liquid ejection head 14 indicates that the flow path in the liquid ejection head 14 has been filled with ink. Furthermore, in FIG. 9, a thick line is used for a part of the arrow representing the recovery flow path CJ to indicate that ink has reached the position in the recovery flow path CJ where the pressure sensor 954 is provided.

In the period Tc, to discharge air bubbles, it is necessary to set the differential pressure between Pt_in and Pt_out to a sufficiently large value. For example, the controller 90 sets Pt_in to a value that satisfies formula (c-1) below.

$$|Pm| < Pt\_in - \Delta Pin \pm |Ph\_in| \qquad \text{(c-1)}$$

By applying equivalence transformation to formula (c-1), formula (c-2) below is obtained.

$$Pt\_in > |Pm| - (-\Delta Pin \pm |Ph\_in|) \qquad \text{(c-2)}$$

Formula (c-2) can be transformed into formula (c-2-1) below when the liquid level in the supply tank 951 is located away from the nozzle N in a direction (Z1 direction) opposite the vertical direction and can be transformed into formula (c-2-2) when the liquid level in the supply tank 951 is away from the nozzle N in the vertical direction (Z2 direction).

$$Pt\_in > |Pm| - (-\Delta Pin + |Ph\_in|) \qquad \text{(c-2-1)}$$

$$Pt\_in > |Pm| - (-\Delta Pin - |Ph\_in|) \qquad \text{(c-2-2)}$$

When the liquid level in the supply tank 951 is located away from the nozzle N in the Z1 direction and when Ph_in is +1 [kPa], ΔPin is 12 [kPa], and |Pm| is 1 [kPa], formula (c-3) below is obtained by substituting these values into the corresponding terms in formula (c-2).

$$Pt\_in > 1\ [\text{kPa}] - (-12\ [\text{kPa}] + 1\ [\text{kPa}]) \dashrightarrow Pt\_in > 12\ [\text{kPa}] \qquad \text{(c-3)}$$

At step S16, the controller 90 drives the pressurizing mechanism IM and adjusts the pressure set by the regulator 9515 according to formula (c-3) so that the pressure measured by the pressure sensor 9517 becomes greater than 12 [kPa].

In relation to the pressure P4 set by the regulator 9515, the positive pressure P3 applied to the supply tank 951 by the return pump 956 is, for example, from 0.2 [kPa] to 0.5 [kPa]. For example, when P3 is 0.2 [kPa], according to formula (a-5) and formula (c-3), P4 is higher than 11.8 [kPa]; and when P3 is 0.5 [kPa], according to formula (a-5) and formula (c-3), P4 is higher than 11.5 [kPa].

For example, the controller 90 sets Pt_out to a value that satisfies formula (c-4) below.

$$-(\Delta Pout \pm |Ph\_out| + |Pm|) > Pt\_out \qquad \text{(c-4)}$$

Here, Ph_out indicates a pressure that acts on the nozzle N due to the head difference between the liquid level in the recovery tank 952 and the nozzle N. When H out indicates the distance (head difference) between the nozzle forming surface FN and the liquid level in the recovery tank 952 in the vertical direction and g indicates gravitational acceleration, the absolute value of the pressure Ph_out caused by the head difference is represented by formula (7) below.

$$|Ph\_out| = H\_out \times g \qquad \text{(7)}$$

Formula (c-5) below is obtained by swapping the sides of formula (c-4).

$$Pt\_out < -(\Delta Pout \pm |Ph\_out| + |Pm|) \qquad \text{(c-5)}$$

Formula (c-5) can be transformed into formula (c-5-1) below when the liquid level in the recovery tank 952 is located away from the nozzle N in a direction (Z1 direction) opposite the vertical direction and can be transformed into formula (c-5-2) when the liquid level in the recovery tank 952 is located away from the nozzle N in the vertical direction (Z2 direction).

$$Pt\_out < -(\Delta Pout + |Ph\_out| + |Pm|) \qquad \text{(c-5-1)}$$

$$Pt\_out < -(\Delta Pout - |Ph\_out| + |Pm|) \qquad \text{(c-5-2)}$$

For example, when the liquid level in the recovery tank 952 is located away from the nozzle N in the Z1 direction and when Ph_out is +1 [kPa], ΔPout is 3 [kPa], and |Pm| is 1 [kPa], formula (c-6) is obtained by substituting these values into the corresponding terms in formula (c-5).

$$Pt\_out<-(3\ [kPa]+1\ [kPa]+1\ [kPa])\rightarrow Pt\_out<-5\ [kPa] \quad (c\text{-}6)$$

In relation to the pressure P2 set by the regulator 9525, the negative pressure P1 applied to the recovery tank 952 by the return pump 956 is, for example, from −0.2 [kPa] to −0.5 [kPa]. For example, when P1 is −0.2 [kPa], according to formula (b-2) and formula (c-6), P2 is lower than −4.8 [kPa]; and when P1 is 0.5 [kPa], according to formula (b-2) and formula (c-6), P2 is lower than −4.5 [kPa].

Referring back to FIG. 5, after performing the first circulation operation for the period Tc, the controller 90 performs the second circulation operation at step S18 and ends the process illustrated in FIG. 5. The period Tc is a period that is necessary to sufficiently remove the air bubbles from the flow path in the liquid ejection head 14 by performing the first circulation operation. The period Tc is obtained by, for example, adding a margin representing a tolerance to a period obtained by an experiment performed by the manufacturer of the liquid ejecting apparatus 100.

The flow rate in the second circulation operation is less than the flow rate in the first circulation operation. For example, the difference between the pressure Pt_in in the supply tank 951 and the pressure Pt_out in the recovery tank 952 in the second circulation operation is less than the difference between the pressure Pt_in in the supply tank 951 and the pressure Pt_out in the recovery tank 952 in the first circulation operation. Performing the second circulation operation makes it possible to suppress the thickening of ink. When receiving the image data Img during the second circulation operation, the controller 90 performs a print operation.

1-5. Summary of First Embodiment

As described above, the liquid ejecting apparatus 100 according to the first embodiment includes the liquid ejection head 14 including the nozzle N that ejects ink, the supply tank 951 that temporarily stores the ink to be supplied to the liquid ejection head 14, the recovery tank 952 that temporarily stores the ink recovered from the liquid ejection head 14, the supply flow path SJ through which the ink is supplied from the supply tank 951 to the liquid ejection head 14, the recovery flow path CJ through which the ink is recovered from the liquid ejection head 14 to the recovery tank 952, the pressurizing mechanism IM that pressurizes the inside of the supply tank 951, and the depressurizing mechanism DM that depressurizes the inside of the recovery tank 952. In the filling period T1, a filling process is performed to fill, with the ink, the nozzle N, the supply flow path SJ, and the recovery flow path CJ that are not filled with the ink; and the filling period T1 includes the period Tb that is after a meniscus of the ink is formed in the nozzle N until the ink reaches the recovery flow path CJ. The pressurizing mechanism IM and the depressurizing mechanism DM are driven in the period Tb; and formula (5), i.e., Pt_out>−|Pm|, is satisfied in the period Tb, where Pm indicates a pressure at which the meniscus of the ink formed in the nozzle N is broken and Pt_out indicates the pressure in the recovery tank 952.

In the filling process, the recovery tank 952 is set to a negative pressure to cause the ink to flow from the liquid ejection head 14 toward the recovery tank 652 and thereby fill the recovery flow path CJ with the ink. However, when the recovery tank 952 is set at the negative pressure in the period Tb in the filling process, there is a risk that the meniscus formed in the nozzle N is broken. In the first embodiment, the meniscus is prevented from being broken due to the negative pressure in the recovery tank 952 by making the absolute value of Pt_out smaller than the absolute value of Pm, in other words, by setting the negative pressure in the recovery tank 952 to such a value that the meniscus can be prevented from being broken. The liquid ejecting apparatus 100 according to the first embodiment makes it possible to prevent the meniscus from being broken and thereby makes it possible to prevent air bubbles from being drawn into the circulation path KJ during the filling process. As described above, the liquid ejecting apparatus 100 according to the first embodiment can prevent air bubbles from being drawn into the circulation path KJ even when the recovery tank 952 is set to a negative pressure in the filling process.

Also, the filling period T1 includes the period Ta that is before the period Tb and extends from before the meniscus of the ink is formed in the nozzle N until the meniscus of the ink is formed in the nozzle N. In the period Ta, the pressurizing mechanism IM is driven, but the depressurizing mechanism DM is not driven.

When the depressurizing mechanism DM is driven in the period Ta, air is drawn into the nozzle N, and air bubbles become more likely to be drawn into the flow path in the liquid ejection head 14. For this reason, the liquid ejecting apparatus 100 according to the first embodiment is configured to not drive the depressurizing mechanism DM in the period Ta and can therefore prevent air from being drawn into the circulation path KJ via the nozzle N.

Also, in the period Tc after the period Tb and after the time when the ink reaches the recovery flow path CJ, the controller 90 makes the pressure in the supply tank 951 higher than the pressure in the recovery tank 952 to perform a circulation operation for circulating the ink through the circulation path KJ including the liquid ejection head 14, the supply tank 951, the supply flow path SJ, the recovery tank 952, and the recovery flow path CJ; and formula (c-5), i.e., Pt_out<−(ΔPout±|Ph_out|+|Pm|) is satisfied in the period Tc, where ΔPout indicates the absolute value of pressure loss between the recovery tank 952 and the nozzle N and Ph_out indicates a pressure that acts on the nozzle N due to the head difference between the liquid level in the recovery tank 952 and the nozzle N.

Because pressure loss occurs when the ink reaches the recovery flow path CJ and the pressure Ph_out is generated due to the head difference when the recovery flow path CJ is filled with the ink, there is a case in which the ink cannot be recovered from the liquid ejection head 14 with the pressure in the recovery tank 952 in the period Tb. For this reason, formula (c-5) is satisfied to make it possible to quickly and reliably send the ink from the liquid ejection head 14 to the recovery tank 952 in the period Tc that is after the time when the ink reaches the recovery flow path CJ.

A part of formula (a-3), specifically, Pt_in<|Pm|(−ΔPin±|Ph_in|), is satisfied in the period Tb, where Pt_in indicates the pressure in the supply tank 951, ΔPin indicates the absolute value of pressure loss between the supply tank 951 and the nozzle N, and Ph_in indicates the pressure that acts on the nozzle N due to the head difference between the liquid level in the supply tank 951 and the nozzle N.

By satisfying Pt_in<|Pm|−(−ΔPin±|Ph_in|), the liquid ejecting apparatus 100 according to the first embodiment can prevent the ink from leaking out of the nozzle N due to the breaking of the meniscus in the filling process.

Also, in the period Tc, formula (c-2), i.e., Pt_in>|Pm|−(−ΔPin±|Ph_in|), is satisfied.

Satisfying formula (c-2) makes it possible to quickly and reliably send the ink from the liquid ejection head 14 to the recovery tank 952 in the period Tc that is after the time when the ink reaches the recovery flow path CJ.

The liquid ejecting apparatus 100 further includes the pressure sensor 954 that detects that the ink has reached the recovery flow path CJ. The liquid ejecting apparatus 100 proceeds from the period Tb to the period Tc when the pressure sensor 954 detects that the ink has reached the recovery flow path CJ.

The arrival of the ink at the recovery flow path CJ may also be detected in a manner different from the present embodiment. For example, it is possible to determine, without using the pressure sensor 954, that the ink has reached the recovery flow path CJ when a second predetermined period has passed after the driving of the pressurizing mechanism IM is started or after the meniscus of the ink is formed in the nozzle N. The second predetermined period may be obtained by, for example, adding a margin representing a tolerance to a period obtained by an experiment performed by the manufacturer of the liquid ejecting apparatus 100. However, compared to the manner in which it is determined that the ink has reached the recovery flow path CJ when the second predetermined period has passed, the liquid ejecting apparatus 100 according to the first embodiment can quickly proceed to the period Tc when the ink actually reaches the recovery flow path CJ. Being able to quickly proceed to the period Tc makes it possible to switch to the first circulation operation at an earlier timing.

The circulation path KJ includes the relay flow path IJ through which the recovery tank 952 communicates with the supply tank 951, and the return pump 956 is provided in the relay flow path IJ to send the ink from the recovery tank 952 to the supply tank 951. $P2>-|Pm|-P1$ is satisfied in the period Tb, where P1 indicates a negative pressure generated in the recovery tank 952 by driving the return pump 956 and P2 indicates a negative pressure generated in the recovery tank 952 by the depressurizing mechanism DM.

In a configuration where the pressurizing mechanism and the depressurizing mechanism are provided separately, the pressure generated by the return pump is normally very small compared to the differential pressure generated during the circulation operation and therefore can be ignored. However, in the period Tb in the present embodiment, because the negative pressure set in the recovery tank 952 is small, the influence of the pressure generated by the return pump 956 is large. For this reason, in the liquid ejecting apparatus 100 according to the first embodiment, the negative pressure generated in the recovery tank 952 by the depressurizing mechanism DM is set considering the negative pressure generated by driving the return pump 956. Compared with the manner in which the pressure generated by the return pump 956 is not considered, the configuration of the first embodiment makes it easier to satisfy formula (2) and thereby makes it possible to more effectively prevent the meniscus from being broken.

The above descriptions may also be applied to a liquid filling method in which the liquid ejecting apparatus 100 according to the first embodiment drives the depressurizing mechanism DM such that $Pt\_out>-|Pm|$ is satisfied in the period Tb, where Pm indicates a breaking pressure at which the meniscus of the ink formed in the nozzle N is broken and Pt_out indicates the pressure in the recovery tank 952.

2. Second Embodiment

In the first embodiment, a meniscus of ink is formed in the nozzle N by supplying the ink to the liquid ejection head 14 from the supply tank 951. However, the method of forming a meniscus of ink in the nozzle N is not limited to this example. A second embodiment is described below.

Figure 10:
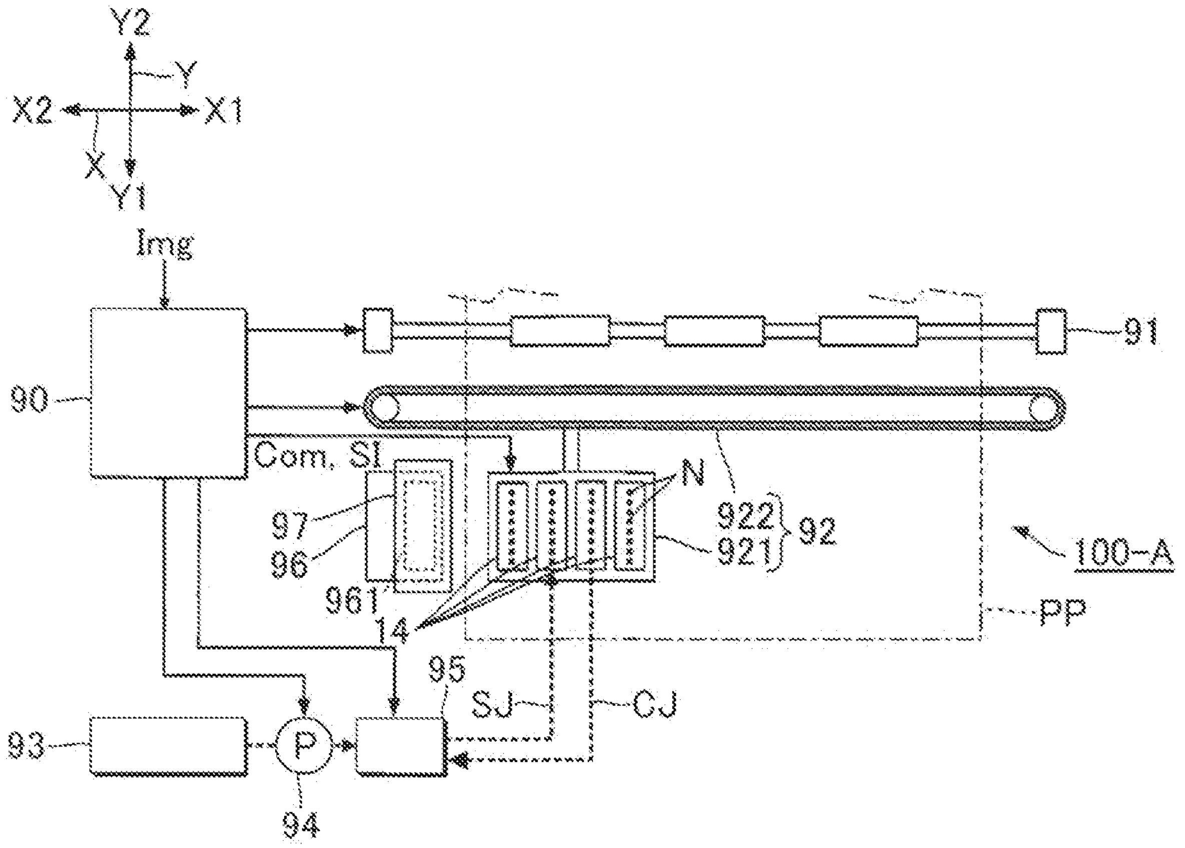
FIG. 10 is a drawing illustrating an example of a liquid ejecting apparatus according to a second embodiment.

FIG. 10 is a drawing illustrating an example of a liquid ejecting apparatus 100-A according to the second embodiment. The liquid ejecting apparatus 100-A differs from the liquid ejecting apparatus 100 in that the liquid ejecting apparatus 100-A includes a wiping mechanism 96 and an application mechanism 97. The wiping mechanism 96 includes a wiper 961 that contacts the nozzle forming surface FN and is used in an operation for wiping the nozzle forming surface FN.

The wiping mechanism 96 is disposed to face the nozzle forming surface FN when the liquid ejection head 14 is located in a standby position where the nozzle forming surface FN does not face the medium PP. The standby position corresponds to a home position that corresponds to the end point of the back-and-forth movement of the liquid ejection head 14.

The wiper 961 has a blade shape and is formed of an elastic material such as rubber. The material of the wiper 961 is not limited to an elastic material but may also be a fibrous material such as fabric or nonwoven fabric. The wiper 961 is an example of a "wiping member".

The wiper 961 wipes off substances adhering to the nozzle forming surface FN. Examples of such substances include ink and fragments of the medium PP. The controller 90 wipes off substances adhering to the nozzle forming surface FN by moving either one of the wiper 961 and the nozzle forming surface FN relative to the other. This means that either the liquid ejection head 14 is moved along the X-axis while maintaining the position of the wiper 961 or the wiper 961 is moved along the X-axis while maintaining the position of the liquid ejection head 14. In the descriptions below, it is assumed that the liquid ejection head 14 is moved along the X-axis while maintaining the position of the wiper 961.

The application mechanism 97 applies ink to the wiper 961 under the control of the controller 90. For example, the application mechanism 97 is supplied with ink from the reservoir 93 and applies ink to the wiper 961 while the liquid ejection head 14 is not in the standby position. As illustrated in FIG. 10, when applying ink, the application mechanism 97 is positioned to overlap the wiper 961 in plan view in the Z-axis direction. To prevent the liquid ejection head 14 from colliding with the application mechanism 97 when the liquid ejection head 14 is in the standby position, the application mechanism 97 may be configured to move in the Z1 direction to such an extent that the collision with the liquid ejection head 14 is prevented or may be configured to move in the X2 direction to such an extent that the collision with the liquid ejection head 14 is prevented. Here, the application mechanism 97 may instead be configured to apply a liquid other than ink to the wiper 961. The liquid other than ink may be, for example, a cleaning liquid used to improve the wiping performance of wiping the nozzle forming surface FN.

2-1. Operation of Controller in Second Embodiment

Figure 11:
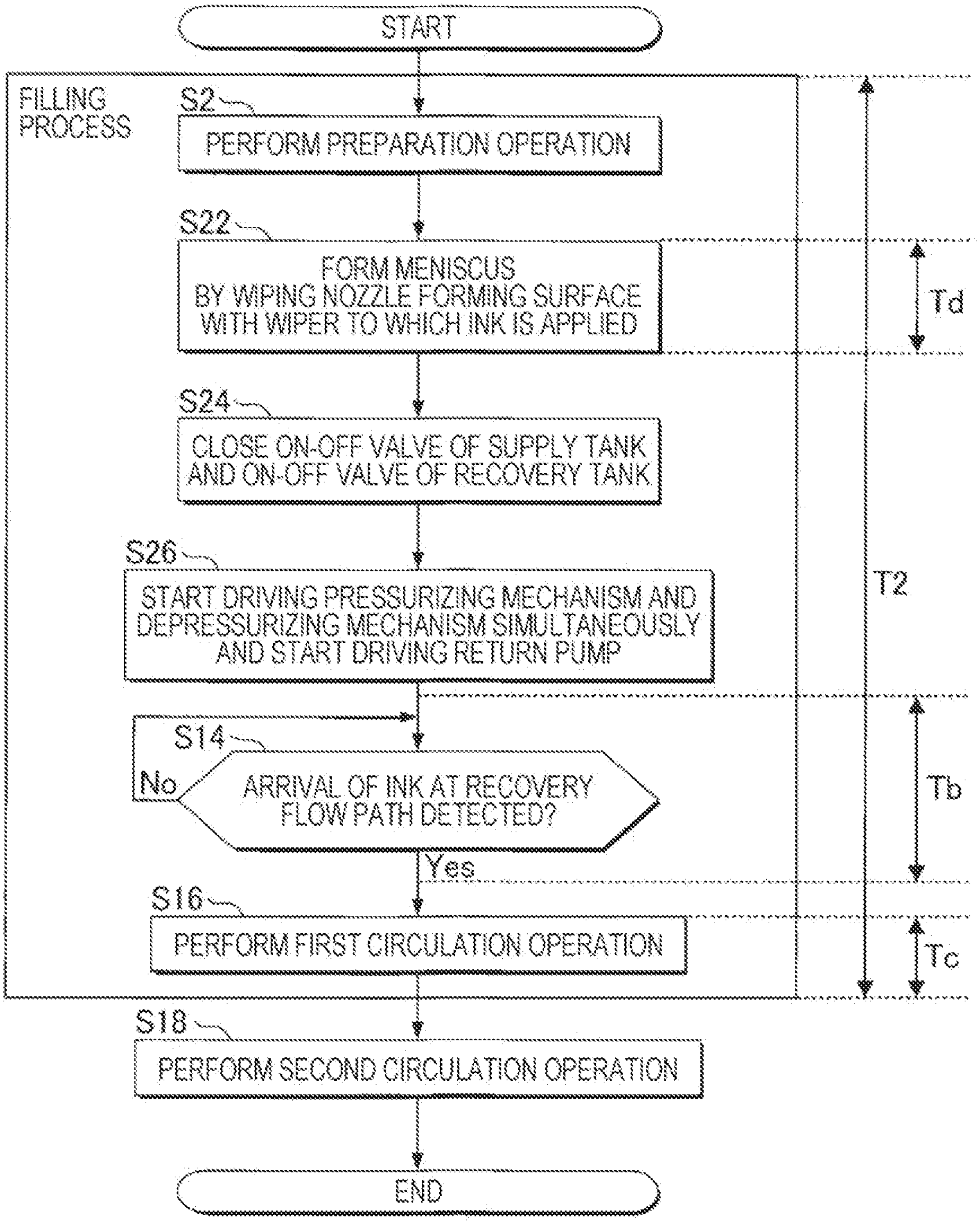
FIG. 11 is a flowchart illustrating a process performed by a controller to fill flow paths with ink according to the second embodiment.

FIG. 11 is a flowchart illustrating a process performed by the controller 90 to fill flow paths with ink. As illustrated in FIG. 11, when filling the flow path in the liquid ejection head 14 including the nozzle N, the supply flow path SJ, and the recovery flow path CJ with ink, the controller 90 performs a filling process according to the second embodiment and the second circulation operation in this order. T2 indicates a filling period in which the filling process according to the second embodiment is performed. In the filling period T2, a period from before a meniscus of ink is formed in the nozzle N until the meniscus of ink is formed in the nozzle N is referred to as a period Td. Also, in the filling period T2, a period that is after the period Td and from after the meniscus of ink is formed in the nozzle N and until the ink reaches the recovery flow path CJ is referred to as a period Tb. The filling period T2 is an example of a "filling period" in the second embodiment. The period Td is an example of a "third period".

In FIG. 11, the same reference numbers as in FIG. 5 are assigned to steps that are identical to the steps in FIG. 5, and the descriptions of those steps are omitted. As the filling process according to the second embodiment, the controller 90 performs steps S2, S22, S24, S26, S14, and S16 in this order. At step S22, the controller 90 controls the application mechanism 97 to apply ink to the wiper 961 and controls the wiping mechanism 96 to wipe the nozzle forming surface FN with the wiper 961 to which ink is applied and thereby form a meniscus of ink in the nozzle N. As described above, the application mechanism 97 may apply a liquid other than ink to the wiper 961. For example, at step 22, a meniscus of a cleaning liquid may be formed in the nozzle N. The time at which step S22 is started is the start time of the period Td. Also, the time at which step S22 is completed is the end time of the period Td. The state of the liquid ejecting apparatus 100-A immediately after the end of the period Td is described with reference to FIG. 12.

Figure 12:
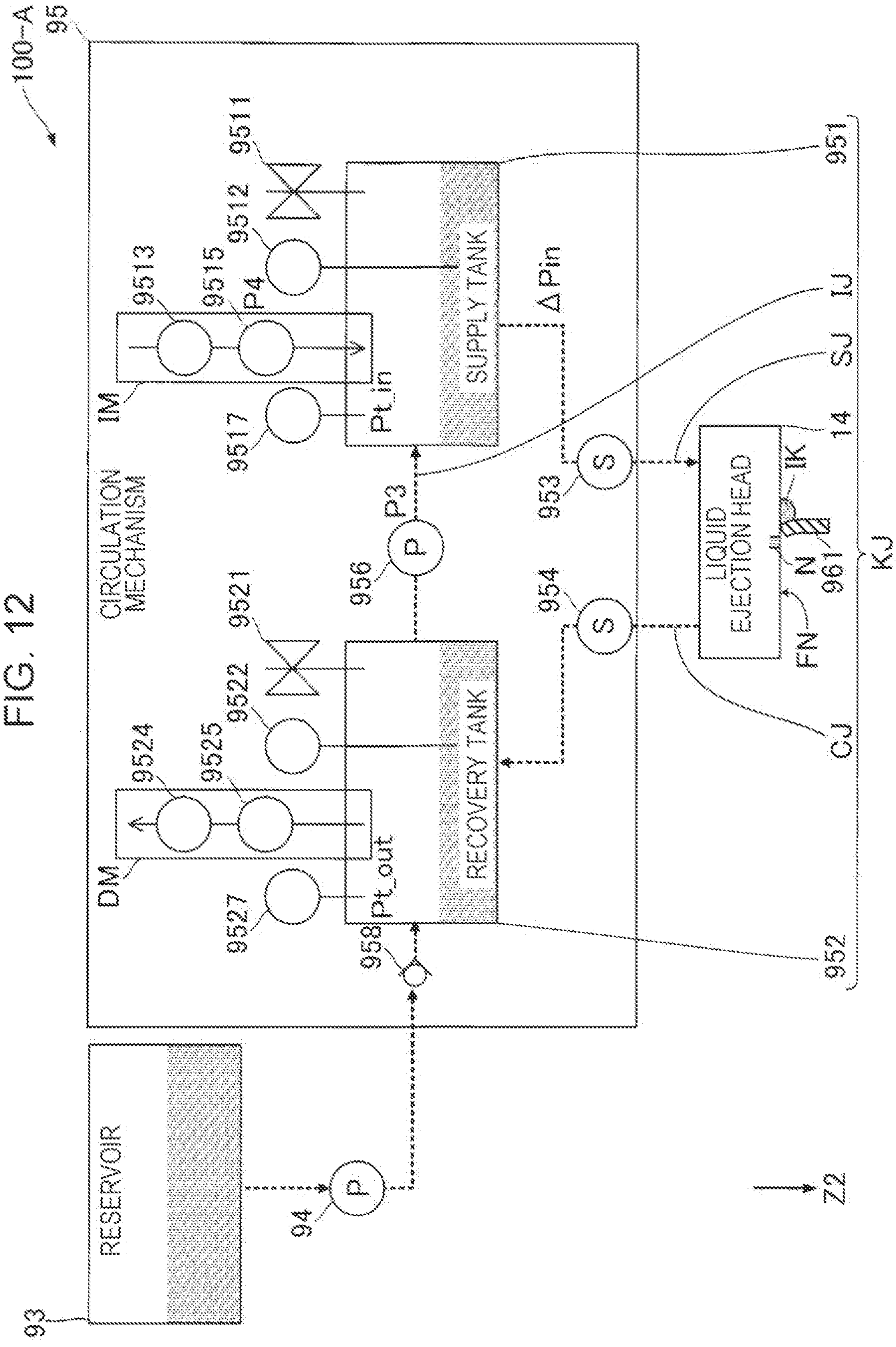
FIG. 12 is a drawing illustrating a state of the liquid ejecting apparatus of the second embodiment immediately after the end of a period Td.

FIG. 12 is a drawing illustrating the state of the liquid ejecting apparatus 100-A immediately after the end of the period Td. Immediately after the end of the period Td, the on-off valve 9511 and the on-off valve 9521 are open. In the period Td, the meniscus of ink is formed in the nozzle N as a result of wiping the nozzle forming surface FN with the wiper 961 to which ink is applied. FIG. 12 illustrates a state in which the nozzle forming surface FN is wiped with the wiper 961 to which ink IK is applied. Also, in FIG. 12, the formation of the meniscus of ink in the nozzle N is indicated by shading in the nozzle N.

Referring back to FIG. 11, after step S22, the controller 90, at step S24, closes the on-off valve 9511 of the supply tank 951 and the on-off valve 9521 of the recovery tank 952. Next, at step S26, the controller 90 starts driving the pressurizing mechanism IM and the depressurizing mechanism DM simultaneously and starts driving the return pump 956. The time at which Pt_in satisfies formula (a-3) and Pt_out satisfies formula (5) after the pressurizing mechanism IM and the depressurizing mechanism DM are started to be driven corresponds to the start time of the period Tb. Similarly to the first embodiment, the timing at which the return pump 956 is started to be driven is not limited to step S26. The return pump 956 may be started to be driven before step S16 at the latest. Because Pt_in and Pt_out in step S26 are the same as Pt_in and Pt_out in the period Tb in the first embodiment, the descriptions of Pt_in and Pt_out are omitted here. After step S26, the controller 90 performs step S14.

2-2. Summary of Second Embodiment

As described above, the liquid ejecting apparatus 100-A according to the second embodiment further includes the wiper 961 to which ink is applied, the liquid ejection head 14 includes the nozzle forming surface FN in which the nozzle N is formed, and the filling period T2 includes the period Td that is before the period Tb and in which the meniscus of ink is formed in the nozzle N by wiping the nozzle forming surface FN with the wiper 961.

The liquid ejecting apparatus 100-A according to the second embodiment does not have to determine the timing at which the period Ta ends, in other words, the liquid ejecting apparatus 100-A according to the second embodiment does not have to determine whether the meniscus of ink has been formed in the nozzle N. Accordingly, the liquid ejecting apparatus 100-A according to the second embodiment does not need to include a mechanism for determining the timing at which the period Ta ends. Therefore, the configuration of the liquid ejecting apparatus 100-A can be simplified compared to the liquid ejecting apparatus 100 according to the first embodiment. Here, generally, the length of the period Td is shorter than the length of the period Ta. Accordingly, compared to the liquid ejecting apparatus 100 according to the first embodiment, the liquid ejecting apparatus 100-A according to the second embodiment can shorten the period from the start of the filling process to the formation of the meniscus of ink in the nozzle N.

Also, in the period Td, the pressurizing mechanism IM and the depressurizing mechanism DM are started to be driven at the same timing.

The liquid ejecting apparatus 100-A according to the second embodiment does not have to determine the timing at which the period Ta ends. Also, the period in which at least one of the pressurizing mechanism IM and the depressurizing mechanism DM is driven corresponds to the period Tb in the second embodiment and corresponds to the period from the start of the period Ta to the end of the period Tb in the first embodiment. The depressurizing mechanism DM is not driven in the period Ta according to the first embodiment. Therefore, it is supposed that the average of the differential pressure between Pt_in and Pt_out in the filling period T2 is higher than the average of the differential pressure between Pt_in and Pt_out in the filling period T1. For the reasons described above, the average of the flow rate of ink in the filling period T2 is greater than the average of the flow rate of ink in the filling period T1. Therefore, compared to the liquid ejecting apparatus 100 according to the first embodiment, the liquid ejecting apparatus 100-A according to the second embodiment can shorten the filling period T2.

3. Variations

Each of the embodiments described above may be modified in various manners. Specific examples of modifications are described below. Two or more variations arbitrarily selected from the examples below may be combined as appropriate unless they do not conflict with each other.

3-1. First Variation

In each of the above embodiments, the pressure sensor 953 is used to detect that ink has reached the recovery flow path CJ. However, any other means may also be used to detect that ink has reached the recovery flow path CJ.

Figure 13:
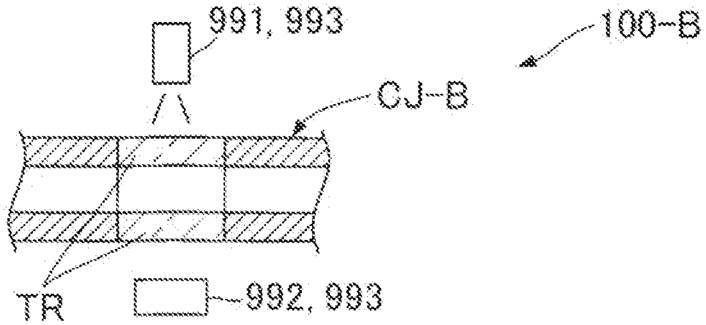
FIG. 13 is a drawing for describing a liquid ejecting apparatus according to a first variation.

FIG. 13 is a drawing for describing a liquid ejecting apparatus 100-B according to a first variation. The liquid ejecting apparatus 100-B differs from the liquid ejecting apparatus 100 in that the liquid ejecting apparatus 100-B includes an optical sensor 993 including a light emitter 991 and a light receiver 992 instead of the pressure sensor 953 and includes a recovery flow path CJ-B instead of the recovery flow path CJ. FIG. 13 illustrates a cross-section of a part of the recovery flow path CJ-B and a portion around the part of the recovery flow path CJ-B. In the first variation, the optical sensor 993 is an example of a "detector".

The light emitter 991 is capable of emitting light under the control of the controller 90. The light receiver 992 receives the light emitted by the light emitter 991. In the descriptions below, for brevity, the light emitted by the light emitter 991 may be referred to as "emitted light". The emitted light may be any type of light, such as ultraviolet light, visible light, or infrared light, that can be detected by the light receiver 992. A part TR of the recovery flow path CJ-B is formed of a material that is translucent to the emitted light. The material of the part TR may be, for example, a transparent resin material. Alternatively, the entire recovery flow path CJ-B may be formed of a material that is translucent to the emitted light. Ink according to the first variation is not cured by the emitted light. Also, it is assumed that the ink according to the first variation has a property of blocking the emitted light.

As illustrated in FIG. 13, the part TR is provided between the light emitter 991 and the light receiver 992. When the ink has not reached the part TR, light emitted from the light emitter 991 passes through the part TR and reaches the light receiver 992. In contrast, when the ink has reached the part TR, the light emitted from the light emitter 991 is blocked by the ink and does not reach the light receiver 992. Therefore, the optical sensor 993 can detect whether the ink is in the part TR based on the result of detecting the emitted light by the light receiver 992. Thus, the optical sensor 993 is a so-called transmissive optical sensor. The ink in the part TR does not have to completely block the emitted light. As long as the ink in the part TR attenuates the light emitted from the light emitter 991, even if the attenuated light reaches the light receiver 992, the light receiver 992 can determine whether the ink is present in the part TR by detecting whether the light from the light emitter 991 has been attenuated.

As described above, the liquid ejecting apparatus 100-B according to the first variation further includes the optical sensor 993 including the light emitter 991 configured to emit light and the light receiver 992 configured to receive the light emitted from the light emitter 991. The part TR of the recovery flow path CJ-B is formed of a material that is translucent to the light emitted from the light emitter 991, and the optical sensor 993 is configured to detect whether the ink is present in the part TR.

There is a type of ink, such as UV ink, that cures when exposed to light. Here, UV stands for ultra violet. However, general ink does not have a property of curing when exposed to light. Therefore, the liquid ejecting apparatus 100-B according to the first variation can easily detect that ink has reached the recovery flow path CJ-B regardless of the type of ink used, unless the ink has a property of being cured by the light emitted by the light emitter 991.

In the first variation, it is assumed that the ink has a property of blocking the emitted light. However, the ink may be translucent to the emitted light. Even when ink is translucent to the emitted light, the refractive index of ink is normally different from the refractive index of air. Therefore, the positional relationship among the light emitter 991, the light receiver 992, and the part TR may be set such that the light emitted from the light emitter 991 when the ink is not present in the part TR reaches the light receiver 992 and the light emitted from the light emitter 991 when the ink is present in the part TR is refracted in the ink and does not reach the light receiver 992.

3-2. Second Variation

In the first variation, the optical sensor 993 is a transmissive optical sensor and configured such that the part TR is provided between the light emitter 991 and the light receiver 992. However, the configuration of the optical sensor 993 is not limited to this example. For example, in plan view in a direction orthogonal to a straight line extending along the part TR, the light emitter 991 and the light receiver 992 may be provided in a space on one side of a central axis corresponding to the straight line extending along the part TR, and a reflecting plate for reflecting the emitted light may be provided in a space on the other side of the central axis. When the ink has not reached the part TR, the light emitted from the light emitter 991 is reflected by the reflecting plate and reaches the light receiver 992. In contrast, when the ink has reached the part TR, the light emitted from the light emitter 991 is blocked by the ink in the part TR and does not reach the light receiver 992.

3-3. Third Variation

In the first embodiment and the second embodiment, the pressure sensor 954 is an example of a "detector"; and in the first variation and the second variation, the optical sensor 993 is an example of a "detector". However, the "detector" is not limited to the pressure sensor 954 and the optical sensor 993. For example, a flowmeter provided in the recovery flow path CJ may be used as the "detector". The flowmeter may be, for example, an ultrasonic flowmeter, an electromagnetic flowmeter, or a thermal flowmeter.

3-4. Fourth Variation

In each of the above embodiments, the reservoir 93 is configured to supply ink to the recovery tank 952. However, the configuration of the reservoir 93 is not limited to this example. For example, the reservoir 93 may be configured to supply ink to the supply tank 951. In a preparation operation according to the fourth variation, the controller 90 sends ink stored in the reservoir 93 to the supply tank 951. Next, after closing the on-off valve 9511 of the supply tank 951, the controller 90 sends ink in the supply tank 951 to the recovery tank 952 by reversing the return pump 956. Here, sending the ink in the supply tank 951 to the recovery tank 952 is not necessarily performed.

3-5. Fifth Variation

In the fourth variation, the ink in the supply tank 951 is sent to the recovery tank 952 by reversing the return pump 956 after closing the on-off valve 9511 of the supply tank 951. However, the ink in the supply tank 951 may be sent to the recovery tank 952 in a manner different from the fourth variation. For example, the controller 90 may be configured to close the on-off valve 9521 of the recovery tank 952 after sending the ink stored in the reservoir 93 to the supply tank 951 and then set the pressure in the recovery tank 952 to a negative pressure by using the depressurizing mechanism DM. By setting the pressure in the recovery tank 952 to a negative pressure, the liquid ejecting apparatus 100 can send the ink in the supply tank 951 to the recovery tank 952.

3-6. Sixth Variation

In the first embodiment and in each variation based on the first embodiment, the controller 90 determines that a meniscus of ink has been formed in the nozzle N when the first predetermined period has passed after starting to drive the pressurizing mechanism IM. However, the formation of the meniscus of ink may also be determined in any other appropriate manner. For example, the formation of the meniscus of ink in the nozzle N may be determined based on a measurement result of the pressure sensor 954. When a state in which the meniscus of ink has not been formed in the nozzle N and the recovery flow path CJ is in communication with the atmosphere via the nozzle N changes to a state in which the meniscus of ink has been formed in the nozzle N and the recovery flow path CJ is not in communication with the atmosphere, the pressure measured by the pressure sensor 954 changes greatly. Accordingly, the pressure sensor 954 can detect that the meniscus of ink has been formed in the nozzle N. The pressure sensor 954 sends, to the controller information indicating that the meniscus of ink has not been formed in the nozzle N, information indicating that the meniscus of ink has been formed in the nozzle N, and information indicating that the ink has reached the recovery flow path CJ as measurement information.

The liquid ejecting apparatus 100 according to the sixth variation can quickly proceed to the period Tb after the meniscus of ink is actually formed in the nozzle N. Being able to quickly proceed to the period Tb makes it possible to shorten the filling period T1.

3-7. Seventh Variation

In each of the above embodiments, the liquid ejecting apparatus 100 includes the pressure sensor 954 that detects that ink has reached the recovery flow path CJ. However, the configuration of the liquid ejecting apparatus 100 is not limited to this example. For example, the liquid ejecting apparatus 100 does not necessarily include the pressure sensor 954. In this case, the liquid ejecting apparatus 100 may determine that ink has reached the recovery flow path CJ when the second predetermined period has passed after the pressurizing mechanism IM is started to be driven or after the meniscus of ink is formed in the nozzle N. Because the liquid ejecting apparatus 100 according to the seventh variation does not need to include the pressure sensor 954, the configuration of the liquid ejecting apparatus 100 according to the seventh variation can be simplified compared to the liquid ejecting apparatus 100 according to the first embodiment.

3-8. Eighth Variation

In each of the above embodiments, it is assumed that the liquid ejecting apparatus 100 is a serial printer in which the housing case 921 is moved back and forth in the X-axis direction. However, the present disclosure is not limited to this example. For example, the liquid ejecting apparatus 100 may be implemented as a line printer in which multiple nozzles N are distributed across the entire width of the medium PP.

3-9. Ninth Variation

Each of the liquid ejecting apparatuses according to the above embodiments may be used for a device dedicated for printing and may also be used for other types of devices such as a facsimile machine and a copier. Also, the use of the liquid ejecting apparatuses according to the present disclosure is not limited to printing. For example, a liquid ejecting apparatus configured to eject a solution of a color material may be used as a manufacturing device for forming a color filter of a liquid crystal display device. Also, a liquid ejecting apparatus configured to eject a solution of a conductive material may be used as a manufacturing device for forming wiring and electrodes of a wiring substrate.

4. Appendices

Configurations as described below may be derived from the above embodiments.

A liquid ejecting apparatus according to a first aspect of the present disclosure includes a liquid ejection head including a nozzle that ejects a liquid, a supply tank that temporarily stores the liquid to be supplied to the liquid ejection head, a recovery tank that temporarily stores the liquid recovered from the liquid ejection head, a supply flow path through which the liquid is supplied from the supply tank to the liquid ejection head, a recovery flow path through which the liquid is recovered from the liquid ejection head to the recovery tank, a pressurizing mechanism that pressurizes the inside of the supply tank, and a depressurizing mechanism that depressurizes the inside of the recovery tank. A filling period, in which a filling process is performed to fill, with the liquid, the nozzle, the supply flow path, and the recovery flow path that are not filled with the liquid, includes a first period that is after a meniscus of the liquid is formed in the nozzle and before the liquid reaches the recovery flow path. In the first period, the pressurizing mechanism and the depressurizing mechanism are driven; and in the first period, $Pt\_out > -|Pm|$ is satisfied, where Pm indicates a pressure at which the meniscus of the liquid formed in the nozzle is broken and Pt_out indicates a pressure in the recovery tank.

According to the first aspect, the absolute value of Pt_out is made smaller than the absolute value of Pm. This makes it possible to prevent the meniscus from being broken due to the negative pressure in the recovery tank. According to the first aspect, the meniscus is prevented from being broken. This in turn makes it possible to prevent air bubbles from being drawn into the circulation path during the filling process.

According to a second aspect that is a specific example of the first aspect, the filling period includes a second period that is before the first period and is from before the meniscus of the liquid is formed in the nozzle until the meniscus of the liquid is formed in the nozzle; and in the second period, the pressurizing mechanism is driven, and the depressurizing mechanism is not driven.

When the depressurizing mechanism is driven in the second period, air is drawn into the nozzle, and air bubbles become more likely to be drawn into the flow path in the liquid ejection head. Accordingly, by not driving the depressurizing mechanism DM, the second aspect can prevent air from being drawn into the circulation path through the nozzle.

According to a third aspect that is a specific example of the first aspect, the liquid ejecting apparatus further includes a wiping member to which the liquid is applied, the liquid ejection head includes a nozzle forming surface in which the nozzle is formed, and the filling period includes a third period that is before the first period and in which the meniscus of the liquid is formed in the nozzle by wiping the nozzle forming surface with the wiping member.

The liquid ejecting apparatus according to the third aspect does not have to determine the timing at which the second period ends. Therefore, the third aspect eliminates the need to provide a mechanism for determining the timing at which the second period ends and thereby makes it possible to simplify the configuration of the liquid ejecting apparatus compared to the second aspect.

According to a fourth aspect that is a specific example of the third aspect, in the first period, the pressurizing mechanism and the depressurizing mechanism are started to be driven at the same timing.

At least one of the pressurizing mechanism and the depressurizing mechanism is driven in the first period according to the fourth aspect and is driven in a period from the start of the second period to the end of the first period according to the second aspect. In the second period according to the second aspect, the depressurizing mechanism is not driven. Therefore, it is supposed that the average of the differential pressure between Pt_in and Pt_out in the filling period according to the fourth aspect is higher than the average of the differential pressure between Pt_in and Pt_out in the filling period according to the second aspect. Accordingly, the fourth aspect makes it possible to shorten the filling period compared to the second aspect.

According to a fifth aspect that is a specific example of the first aspect, the filling period includes a fourth period that is after the first period and after the liquid reaches the recovery flow path; in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path; and in the fourth period, $Pt\_out<-(\Delta Pout\pm|Ph\_out|+|Pm|)$ is satisfied, where ΔPout indicates the absolute value of pressure loss between the recovery tank and the nozzle and Ph_out indicates a pressure acting on the nozzle due to a head difference between a liquid level in the recovery tank and the nozzle.

Because pressure loss occurs when the liquid reaches the recovery flow path CJ and the pressure Ph_out is generated due to the head difference when the recovery flow path is filled with the liquid, there is a case in which the liquid cannot be recovered from the liquid ejection head with the pressure in the recovery tank in the first period. For this reason, $Pt\_out<-(\Delta Pout\pm|Ph\_out|+|Pm|)$ is satisfied to make it possible to quickly and reliably send the liquid from the liquid ejection head to the recovery tank in the fourth period that is after the liquid reaches the recovery flow path.

According to a sixth aspect that is a specific example of the first aspect, in the first period, $Pt\_in<|Pm|-(-\Delta Pin\pm|Ph\_in|)$ is satisfied, where Pt_in indicates a pressure in the supply tank, ΔPin indicates the absolute value of pressure loss between the supply tank and the nozzle, and Ph_in indicates a pressure acting on the nozzle due to a head difference between a liquid level in the supply tank and the nozzle.

By satisfying $Pt\_in<|Pm|-(-\Delta Pin\pm|Ph\_in|)$, the sixth aspect makes it possible to prevent the liquid from leaking out of the nozzle due to the breaking of the meniscus during the filling process.

According to a seventh aspect that is a specific example of the sixth aspect, the filling period includes a fourth period that is after the first period and after the liquid reaches the recovery flow path; in the fourth period, a circulation operation is performed to make the pressure in the supply tank higher than the pressure in the recovery tank and thereby circulate the liquid through a circulation path including the liquid ejection head, the supply tank, the supply flow path, the recovery tank, and the recovery flow path; and in the fourth period, $Pt\_in>|Pm|-(-\Delta Pin\pm|Ph\_in|)$ is satisfied.

Satisfying $Pt\_in>|Pm|-(-\Delta Pin\pm|Ph\_in|)$ makes it possible to quickly and reliably send the liquid from the liquid ejection head to the recovery tank in the fourth period that is after the liquid reaches the recovery flow path.

In an eighth aspect that is a specific example of the first aspect, the filling period includes a fourth period that is after the first period and after the liquid reaches the recovery flow path; in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path; the liquid ejecting apparatus further includes a detector that detects that the liquid has reached the recovery flow path; and the liquid ejecting apparatus proceeds from the first period to the fourth period when the detector detects that the liquid has reached the recovery flow path.

According to the eighth aspect, the liquid ejecting apparatus can quickly proceed to the fourth period when the liquid actually reaches the recovery flow path.

According to a ninth aspect that is a specific example of the eighth aspect, the detector is an optical sensor including a light emitter configured to emit light and a light receiver configured to receive the light emitted from the light emitter; at least a part of the recovery flow path is formed of a material that is translucent to the light emitted from the light emitter; and the optical sensor is configured to detect whether the liquid is present in the part.

The ninth aspect makes it possible to easily detect that the liquid has reached the recovery flow path regardless of the type of liquid used, unless the liquid has a property of being cured by the light emitted by the light emitter.

According to a tenth aspect that is a specific example of the first aspect, the liquid ejecting apparatus is configured to make a pressure in the supply tank higher than the pressure in the recovery tank and thereby circulate the liquid through a circulation path including the liquid ejection head, the supply tank, the supply flow path, the recovery tank, and the recovery flow path; the circulation path also includes a relay flow path through which the recovery tank communicates with the supply tank; a return pump is provided in the relay flow path to send the liquid from the recovery tank to the supply tank; and in the first period, $P2>-|Pm|-P1$ is satisfied, where P1 indicates a negative pressure generated in the recovery tank by driving the return pump and P2 indicates a negative pressure generated in the recovery tank by the depressurizing mechanism.

In the first period, because the negative pressure set in the recovery tank is small, the influence of the pressure generated by the return pump is large. For this reason, according to the tenth aspect, the negative pressure generated in the recovery tank by the depressurizing mechanism is set considering the negative pressure generated by driving the return pump. Compared with the manner in which the pressure generated by the return pump is not considered, the tenth aspect makes it easier to satisfy $Pt\_out>-|Pm|$ and thereby makes it possible to more effectively prevent the meniscus from being broken.

An eleventh aspect of the present disclosure provides a liquid filling method performed by a liquid ejecting apparatus that includes a liquid ejection head including a nozzle that ejects a liquid, a supply tank that temporarily stores the liquid to be supplied to the liquid ejection head, a recovery tank that temporarily stores the liquid recovered from the liquid ejection head, a supply flow path through which the liquid is supplied from the supply tank to the liquid ejection head, a recovery flow path through which the liquid is recovered from the liquid ejection head to the recovery tank, a pressurizing mechanism that pressurizes the inside of the supply tank, and a depressurizing mechanism that depressurizes the inside of the recovery tank. The liquid filling method includes when a filling period, in which a filling process is performed to fill, with the liquid, the nozzle, the supply flow path, and the recovery flow path that are not filled with the liquid, includes a first period that is after a meniscus of the liquid is formed in the nozzle and before the liquid reaches the recovery flow path, driving the depressurizing mechanism such that $Pt\_out > -|Pm|$ is satisfied in the first period, where Pm indicates a pressure at which the meniscus of the liquid formed in the nozzle is broken and Pt_out indicates a pressure in the recovery tank.

The eleventh aspect provides effects similar to those provided by the first aspect.

According to a twelfth aspect that is a specific example of the eleventh aspect, the filling period includes a second period that is before the first period and is from before the meniscus of the liquid is formed in the nozzle until the meniscus of the liquid is formed in the nozzle; and in the second period, the pressurizing mechanism is driven but the depressurizing mechanism is not driven.

The twelfth aspect provides effects similar to those provided by the second aspect.

According to a thirteenth aspect that is a specific example of the eleventh aspect, the liquid ejecting apparatus further includes a wiping member to which the liquid is applied, the liquid ejection head includes a nozzle forming surface in which the nozzle is formed, and the filling period includes a third period that is before the first period and in which the meniscus of the liquid is formed in the nozzle by wiping the nozzle forming surface with the wiping member.

The thirteenth aspect provides effects similar to those provided by the third aspect.

According to a fourteenth aspect that is a specific example of the eleventh aspect, in the first period, the pressurizing mechanism and the depressurizing mechanism are started to be driven at the same timing.

The fourteenth aspect provides effects similar to those provided by the fourth aspect.

According to a fifteenth aspect that is a specific example of the eleventh aspect, the filling period includes a fourth period that is after the first period and after the liquid reaches the recovery flow path; in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path; and in the fourth period, $Pt\_out < -(\Delta Pout \pm |Ph\_out| + |Pm|)$ is satisfied, where ΔPout indicates the absolute value of pressure loss between the recovery tank and the nozzle and Ph_out indicates a pressure acting on the nozzle due to a head difference between a liquid level in the recovery tank and the nozzle.

The fifteenth aspect provides effects similar to those provided by the fifth aspect.

According to a sixteenth aspect that is a specific example of the eleventh aspect, in the first period, $Pt\_in < |Pm| - (-\Delta Pin \pm |Ph\_in|)$ is satisfied, where Pt_in indicates a pressure in the supply tank, ΔPin indicates the absolute value of pressure loss between the supply tank and the nozzle, and Ph_in indicates a pressure acting on the nozzle due to a head difference between a liquid level in the supply tank and the nozzle.

The sixteenth aspect provides effects similar to those provided by the sixth aspect.

According to a seventeenth aspect that is a specific example of the sixteenth aspect, the filling period includes a fourth period that is after the first period and after the liquid reaches the recovery flow path; in the fourth period, a circulation operation is performed to make the pressure in the supply tank higher than the pressure in the recovery tank and thereby circulate the liquid through a circulation path including the liquid ejection head, the supply tank, the supply flow path, the recovery tank, and the recovery flow path; and in the fourth period, $Pt\_in > |Pm| - (-\Delta Pin \pm |Ph\_in|)$ is satisfied.

The seventeenth aspect provides effects similar to those provided by the seventh aspect.

According to an eighteenth aspect that is a specific example of the eleventh aspect, the filling period includes a fourth period that is after the first period and after the liquid reaches the recovery flow path; in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path; the liquid ejecting apparatus further includes a detector that detects that the liquid has reached the recovery flow path; and the filling process proceeds from the first period to the fourth period when the detector detects that the liquid has reached the recovery flow path.

The eighteenth aspect provides effects similar to those provided by the eighth aspect.

According to a nineteenth aspect that is a specific example of the eighteenth aspect, the detector is an optical sensor including a light emitter configured to emit light and a light receiver configured to receive the light emitted from the light emitter; at least a part of the recovery flow path is formed of a material that is translucent to the light emitted from the light emitter; and the optical sensor is configured to detect whether the liquid is present in the part.

The nineteenth aspect provides effects similar to those provided by the ninth aspect.

According to a twentieth aspect that is a specific example of the eleventh aspect, a pressure in the supply tank is made higher than the pressure in the recovery tank and the liquid is thereby circulated through a circulation path including the liquid ejection head, the supply tank, the supply flow path, the recovery tank, and the recovery flow path; the circulation path also includes a relay flow path through which the recovery tank communicates with the supply tank; a return pump is provided in the relay flow path to send the liquid from the recovery tank to the supply tank; and in the first period, $P2 > -|Pm| - P1$ is satisfied, where P1 indicates a negative pressure generated in the recovery tank by driving the return pump and P2 indicates a negative pressure generated in the recovery tank by the depressurizing mechanism.

The twentieth aspect provides effects similar to those provided by the tenth aspect.

What is claimed is:

1. A liquid ejecting apparatus comprising:

a liquid ejection head including a nozzle configured to eject a liquid;

a supply tank temporarily storing the liquid to be supplied to the liquid ejection head;

a recovery tank temporarily storing the liquid recovered from the liquid ejection head;

a supply flow path supplying the liquid from the supply tank to the liquid ejection head;

a recovery flow path recovering the liquid from the liquid ejection head to the recovery tank;

a pressurizing mechanism pressurizing an inside of the supply tank; and a depressurizing mechanism depressurizing an inside of the recovery tank, wherein a filling period, in which a filling process is performed to fill, with the liquid, the nozzle, the supply flow path, and the recovery flow path that are not filled with the liquid, includes a first period that is after a meniscus of the liquid is formed in the nozzle and before the liquid reaches the recovery flow path;

in the first period, the pressurizing mechanism and the depressurizing mechanism are driven; and in the first period, Pt_out>−|Pm| is satisfied, where Pm indicates a pressure at which the meniscus of the liquid formed in the nozzle is broken and Pt_out indicates a pressure in the recovery tank.

2. The liquid ejecting apparatus according to claim 1, wherein the filling period includes a second period that is before the first period and is from before the meniscus of the liquid is formed in the nozzle until the meniscus of the liquid is formed in the nozzle; and in the second period, the pressurizing mechanism is driven and the depressurizing mechanism is not driven.

3. The liquid ejecting apparatus according to claim 1, further comprising:

a wiping member to which the liquid is applied, wherein the liquid ejection head includes a nozzle forming surface in which the nozzle is formed; and the filling period includes a third period that is before the first period and in which the meniscus of the liquid is formed in the nozzle by wiping the nozzle forming surface with the wiping member.

4. The liquid ejecting apparatus according to claim 3, wherein in the first period, the pressurizing mechanism and the depressurizing mechanism are started to be driven at a same timing.

5. The liquid ejecting apparatus according to claim 1, wherein the filling period includes a fourth period that is after the first period and after the liquid reaches the recovery flow path;

in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path; and in the fourth period, Pt_out<−(ΔPout±|Ph_out|+|Pm|) is satisfied, where ΔPout indicates an absolute value of pressure loss between the recovery tank and the nozzle and Ph_out indicates a pressure acting on the nozzle due to a head difference between a liquid level in the recovery tank and the nozzle.

6. The liquid ejecting apparatus according to claim 1, wherein in the first period, Pt_in<|Pm|−(−ΔPin±|Ph_in|) is satisfied, where Pt_in indicates a pressure in the supply tank, ΔPin indicates an absolute value of pressure loss between the supply tank and the nozzle, and Ph_in indicates a pressure acting on the nozzle due to a head difference between a liquid level in the supply tank and the nozzle.

7. The liquid ejecting apparatus according to claim 6, wherein the filling period includes a fourth period that is after the first period and after the liquid reaches the recovery flow path;

in the fourth period, a circulation operation is performed to make the pressure in the supply tank higher than the pressure in the recovery tank and thereby circulate the liquid through a circulation path including the liquid ejection head, the supply tank, the supply flow path, the recovery tank, and the recovery flow path; and in the fourth period, Pt_in>|Pm|−(−ΔPin±|Ph_in|) is satisfied.

8. The liquid ejecting apparatus according to claim 1, wherein the filling period includes a fourth period that is after the first period and after the liquid reaches the recovery flow path;

in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path;

the liquid ejecting apparatus further comprises a detector configured to detect that the liquid reached the recovery flow path; and the liquid ejecting apparatus proceeds from the first period to the fourth period based on the detector detects that the liquid reached the recovery flow path.

9. The liquid ejecting apparatus according to claim 8, wherein the detector is an optical sensor including a light emitter configured to emit light and a light receiver configured to receive the light emitted from the light emitter;

at least a part of the recovery flow path is formed of a material that is translucent to the light emitted from the light emitter; and the optical sensor is configured to detect whether the liquid is present in the part.

10. The liquid ejecting apparatus according to claim 1, wherein the liquid ejecting apparatus is configured to make a pressure in the supply tank higher than the pressure in the recovery tank and thereby circulate the liquid through a circulation path including the liquid ejection head, the supply tank, the supply flow path, the recovery tank, and the recovery flow path;

the circulation path also includes a relay flow path through which the recovery tank communicates with the supply tank;

a return pump is provided in the relay flow path to send the liquid from the recovery tank to the supply tank; and in the first period, P2>−|Pm|−P1 is satisfied, where P1 indicates a negative pressure generated in the recovery tank by driving the return pump and P2 indicates a negative pressure generated in the recovery tank by the depressurizing mechanism.

11. A liquid filling method performed by a liquid ejecting apparatus that includes a liquid ejection head including a nozzle configured to eject a liquid, a supply tank temporarily storing the liquid to be supplied to the liquid ejection head, a recovery tank temporarily storing the liquid recovered from the liquid ejection head, a supply flow path supplying the liquid from the supply tank to the liquid ejection head, a recovery flow path recovering the liquid from the liquid ejection head to the recovery tank,
a pressurizing mechanism pressurizing an inside of the supply tank, and
a depressurizing mechanism depressurizing an inside of the recovery tank,
the liquid filling method comprising:
when a filling period, in which a filling process is performed to fill, with the liquid, the nozzle, the supply flow path, and the recovery flow path that are not filled with the liquid, includes a first period that is after a meniscus of the liquid is formed in the nozzle and before the liquid reaches the recovery flow path, driving the depressurizing mechanism such that Pt_out>−|Pm| is satisfied in the first period, where Pm indicates a pressure at which the meniscus of the liquid formed in the nozzle is broken and Pt_out indicates a pressure in the recovery tank.

12. The liquid filling method according to claim 11, wherein
the filling period includes a second period that is before the first period and is from before the meniscus of the liquid is formed in the nozzle until the meniscus of the liquid is formed in the nozzle; and
in the second period, the pressurizing mechanism is driven and the depressurizing mechanism is not driven.

13. The liquid filling method according to claim 11, wherein
the liquid ejecting apparatus further includes a wiping member to which the liquid is applied;
the liquid ejection head includes a nozzle forming surface in which the nozzle is formed; and
the filling period includes a third period that is before the first period and in which the meniscus of the liquid is formed in the nozzle by wiping the nozzle forming surface with the wiping member.

14. The liquid filling method according to claim 13, wherein
in the first period, the pressurizing mechanism and the depressurizing mechanism are started to be driven at a same timing.

15. The liquid filling method according to claim 11, wherein
the filling period includes a fourth period that is after the first period and after the liquid reaches the recovery flow path;
in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path; and
in the fourth period, Pt_out<−(ΔPout±|Ph_out|+|Pm|) is satisfied, where ΔPout indicates an absolute value of pressure loss between the recovery tank and the nozzle and Ph_out indicates a pressure acting on the nozzle due to a head difference between a liquid level in the recovery tank and the nozzle.

16. The liquid filling method according to claim 11, wherein
in the first period, Pt_in<|Pm|−(−ΔPin±|Ph_in|) is satisfied, where Pt_in indicates a pressure in the supply tank, ΔPin indicates an absolute value of pressure loss between the supply tank and the nozzle, and Ph_in indicates a pressure acting on the nozzle due to a head difference between a liquid level in the supply tank and the nozzle.

17. The liquid filling method according to claim 16, wherein
the filling period includes a fourth period that is after the first period and after the liquid reaches the recovery flow path;
in the fourth period, a circulation operation is performed to make the pressure in the supply tank higher than the pressure in the recovery tank and thereby circulate the liquid through a circulation path including the liquid ejection head, the supply tank, the supply flow path, the recovery tank, and the recovery flow path; and
in the fourth period, Pt_in>|Pm|−(−ΔPin±|Ph_in|) is satisfied.

18. The liquid filling method according to claim 11, wherein
the filling period includes a fourth period that is after the first period and after the liquid reaches the recovery flow path;
in the fourth period, a circulation operation is performed to make a pressure in the supply tank higher than the pressure in the recovery tank and thereby circulate the liquid through a circulation path including the liquid ejection head, the supply tank, the supply flow path, the recovery tank, and the recovery flow path;
the liquid ejecting apparatus further includes a detector configured to detect that the liquid reached the recovery flow path; and
the filling process proceeds from the first period to the fourth period when the detector detects based on that the liquid reached the recovery flow path.

19. The liquid filling method according to claim 18, wherein
the detector is an optical sensor including a light emitter configured to emit light and a light receiver configured to receive the light emitted from the light emitter;
at least a part of the recovery flow path is formed of a material that is translucent to the light emitted from the light emitter; and
the optical sensor is configured to detect whether the liquid is present in the part.

20. The liquid filling method according to claim 11, wherein
a pressure in the supply tank is made higher than the pressure in the recovery tank and the liquid is thereby circulated through a circulation path including the liquid ejection head, the supply tank, the supply flow path, the recovery tank, and the recovery flow path;
the circulation path also includes a relay flow path through which the recovery tank communicates with the supply tank;
a return pump is provided in the relay flow path to send the liquid from the recovery tank to the supply tank; and
in the first period, P2>−|Pm|−P1 is satisfied, where P1 indicates a negative pressure generated in the recovery tank by driving the return pump and P2 indicates a negative pressure generated in the recovery tank by the depressurizing mechanism.

* * * * *